(12) United States Patent
Futami et al.

(10) Patent No.: US 6,624,272 B2
(45) Date of Patent: Sep. 23, 2003

(54) HOLLOW CROSSLINKED CATIONIC POLYMER PARTICLES, METHOD OF PRODUCING SAID PARTICLES, AND PAINT COMPOSITION, CATIONIC ELECTRODEPOSITION PAINT COMPOSITION, RESIN COMPOSITION, FILLED PAPER, PAPER COATING COMPOSITION, AND COATED PAPER

(75) Inventors: Satoshi Futami, Tokyo (JP); Kouji Tamori, Tokyo (JP); Katsuhiko Tsuruoka, Tokyo (JP)

(73) Assignee: JSR Corporation, Tokyo (JP)

( * ) Notice: Subject to any disclaimer, the term of this patent is extended or adjusted under 35 U.S.C. 154(b) by 101 days.

(21) Appl. No.: 09/739,257

(22) Filed: Dec. 19, 2000

(65) Prior Publication Data

US 2002/0068805 A1 Jun. 6, 2002

(30) Foreign Application Priority Data

| Dec. 20, 1999 | (JP) | 11-360852 |
| Dec. 27, 1999 | (JP) | 11-371370 |
| Jan. 24, 2000 | (JP) | 2000-015028 |
| Jan. 24, 2000 | (JP) | 2000-015029 |
| Jan. 24, 2000 | (JP) | 2000-015030 |
| Feb. 2, 2000 | (JP) | 2000-025694 |
| Feb. 29, 2000 | (JP) | 2000-053351 |

(51) Int. Cl.$^7$ ............ C08F 236/12; C08F 220/10
(52) U.S. Cl. ............ 526/307.3; 526/310; 526/319; 526/342; 526/346; 525/63; 525/70
(58) Field of Search ............ 326/319, 307.3, 326/310, 346, 342, 227, 219.6; 525/63, 70, 86, 316, 317, 326.5

(56) References Cited

U.S. PATENT DOCUMENTS 6,306,961 B1 * 10/2001 Tone et al. .......... 525/63

FOREIGN PATENT DOCUMENTS

| JP | 54-4978 | 3/1979 |
| JP | 55-115476 | 9/1980 |
| JP | 56-34186 | 8/1981 |
| JP | 62-127336 | 6/1987 |
| JP | 62-61077 | 12/1987 |
| JP | 63-86766 | 4/1988 |
| JP | 63-139909 | 6/1988 |
| JP | 1-60516 | 12/1989 |
| JP | 5-306327 | 11/1993 |
| JP | 6-329755 | 11/1994 |
| JP | 7-33848 | 2/1995 |
| JP | 10-25315 | 1/1998 |
| JP | 10-204338 | 8/1998 |
| JP | 10-279639 | 10/1998 |

OTHER PUBLICATIONS

U.S. patent application Ser. No. 09/958,984 filed Oct. 16, 2001, pending.
U.S. patent application Ser. No. 10/135,427 filed May 1, 2002, pending.
U.S. patent application Ser. No. 09/739,257 filed Dec. 19, 2000, pending.

* cited by examiner

*Primary Examiner*—Robert Harlan
(74) *Attorney, Agent, or Firm*—Oblon, Spivak, McClelland, Maier & Neustadt, P.C.

(57) ABSTRACT

An object of the present invention is to provide cationic hollow crosslinked polymer particles that maintain a cationic property over a wide pH range, has adequate strength, and is favorable for use in filled paper, pigments for coating paper, additives for paints, fillers for resins, rubbers, and the like. Another object of the present invention is to provide a method of producing the abovementioned cationic hollow crosslinked polymer particles with excellent characteristics in a stable manner. The hollow crosslinked polymer particles of the present invention are characterized in that (I) the zeta potential as measured in an aqueous medium of pH 2 to 9 is in the range of +5 to +100 mV, (II) the volume hollowness is in the range of 1 to 80%, and (III) the average particle diameter is in the range of 0.03 to 10 $\mu$m. This hollow crosslinked polymer particles are produced by a method that (a) 1 to 99.99 weight % of a crosslinking monomer, (b) 0.01 to 15 weight % of a cationic monomer, and (c) 0 to 98.99 weight % of a copolymerizable monomer that is non-crosslinking and nonionic (the total amount of the monomers being 100 weight %) are polymerized under the presence of polymer particles that are swellable by at least one of the above monomers. This hollow crosslinked cationic polymer particles are utilized for paint composition, cationic electrodeposition paint composition, resin composition, filled paper, paper coating composition, and coated paper, and the like.

14 Claims, No Drawings

HOLLOW CROSSLINKED CATIONIC POLYMER PARTICLES, METHOD OF PRODUCING SAID PARTICLES, AND PAINT COMPOSITION, CATIONIC ELECTRODEPOSITION PAINT COMPOSITION, RESIN COMPOSITION, FILLED PAPER, PAPER COATING COMPOSITION, AND COATED PAPER

BACKGROUND OF THE INVENTION

1. Field of the Invention

The present invention concerns hollow crosslinked cationic polymer particles, which are favorable for use as a filler for filled paper, pigments for coating paper, an additive for and paints, or a filler for resins and rubber, and the like, and a method of producing such hollow crosslinked cationic polymer particles.

The another present invention also concerns a paint composition, which contains hollow crosslinked cationic polymer particles and a film-forming cationic polymer, is excellent in preservation stability, and can form a lightweight coat with high hiding properties.

The another present invention also concerns a paint composition, which contains hollow crosslinked cationic polymer particles and a film-forming cationic polymer, is excellent in preservation stability, and can form a lightweight coat with high hiding properties.

The another present invention also concerns a cationic electrodeposition paint composition, which contains hollow crosslinked cationic polymer particles and a film-forming cationic resin, exhibits excellent stability as an electrodeposition paint, and can form a lightweight coat with high hiding properties.

The another present invention also concerns a resin composition in which hollow crosslinked cationic polymer particles, having specific physical properties, are blended in a resin.

The another present invention also concerns filled paper, which is filled with hollow crosslinked cationic polymer particles, as well as a paper coating composition and coated paper, which contain hollow crosslinked polymer particles as the pigment and a binder component.

2. Prior Arts

Due to their characteristics of being lightweight, high in whiteness, good in dispersion properties, and the like, hollow polymer particles are used as fillers for filled paper, pigments for paper coating, additives for paints, and fillers for resins, rubbers, and the like. Hollow polymer particles that are cationic are especially anticipated for applications to paper coating pigments and fillers for resin due to the expression stability when added to a cationic paint.

Priorly with regard to cationic hollow polymer particles, the use of hollow ampholytic polymer particles at a specific pH has been proposed for example in Japanese laid-open Patent Publication No. 27963 of 1998, and particles, with which a soft polymer with amino groups are swollen by acid and thereby made hollow, have been proposed in Japanese laid-open Patent Publication No. 25315 of 1998.

However, these hollow particles had such problems as not expressing cationic properties at high pH, becoming lowered in strength when used as a filler due to the particles being soft, and the like.

Though an excellent method of producing hollow crosslinked polymer particles has been proposed in Japanese Laid-open Patent Publication No. 127336 of 1987, a method of producing cationic hollow crosslinked polymer particles in a more stable manner has been demanded.

Cationic polymers are used for example in the binder resin of the topcoat of a coat having an acrylic paint or other paint, which uses an anionic resin as the binder resin and is generally used as the interior and exterior paint for a building, as the substrate. As paint resins, cationic polymers exhibit such characteristic performance as forming a coat that is excellent in adhesion properties, forming a strong, cured film with a resin with an epoxy group, and the like.

However, since titanium oxide, calcium carbonate, and the like, which are generally used as the pigments for paints, are anionic, paints containing these pigments and yet having a cationic resin as the binder resin had the disadvantage of being poor in preservation stability.

Meanwhile, though hollow resin particles are effective for realizing lightweight coats and are used as pigments of high hiding property, such particles generally have an anionic surface, and when blended with a paint having a cationic resin as the binder resin, the preservation stability of the paint is poor as in the case where the abovementioned titanium oxide, calcium carbonate, and the like, is blended as the pigment.

Also, since prior hollow resin particles had the disadvantage of becoming dissolved in the plasticizers and organic solvents that are normally used in the paint composition or melting in the process of stoving, paints using hollow resin particles as the pigment were used only in very limited fields.

A cationic electrodeposition paint generally contains various additives, such as a film-forming cationic resin, a curing agent, a pigment component, an aqueous medium, and a surfactant, and the like. The pigment component that is usually contained in such an electrodeposition paint is an inorganic pigment, such as titanium dioxide, kaolin, clay, talc, and the like.

However, the specific gravities of such inorganic pigments are inherently higher than that of the aqueous medium. Also, since the pigment interface is anionic, a cationic electrodeposition paint that contains a cationic resin and the abovementioned pigments are generally poor in dispersion stability. When the dispersion stability of a pigment is poor, the stability of the electrodeposition paint that contains the pigment will be poor, making the control of the electrodeposition bath complex, and since the electrodeposited coat that is formed will also be non-uniform, the quality of the electrodeposited coat can be low in terms of hiding property, and the like, in some cases.

Inorganic pigments, such as calcium carbonate, titanium oxide, and the like, are added to thermoplastic resins, thermosetting resins, and other resin materials to add such performance as hardness, rigidity, whiteness, opacity, and the like.

However, the use of an inorganic pigment had the disadvantage that the lightweight property that is inherent of the resin material is lowered by the high specific gravity of the inorganic material.

The method of using hollow polymer particles has been tried as a means of improvement with regard to this disadvantage. However, since conventionally used hollow polymer particles are anionic and since many of the resin materials are anionic as well, the affinity between the two was inadequate, and these methods therefore had such problems to be solved as being insufficient in the abovementioned improvement of performance and the lowering of the excellent mechanical performance inherent to the resin materials.

Opacity and whiteness are required in many paper products. As a means of adding such performance, the loading of an inorganic pigment, such as talc, clay, calcium carbonate, titanium oxide, and the like, as a filler in the papermaking process to obtain filled paper has been known in general.

The problems of such fillers comprised of inorganic pigment include the following:

(1) The high specific gravity of the filler leads to increased weight of the filled paper.

(2) Since the filler is high in specific gravity and since the surface charges give the filler distinct ionic properties, the filler tends to sediment readily and is therefore not loaded sufficiently, making the yield of loading and uniformity of dispersion of the filler poor.

The method of using hollow polymer particles has been tried as a means of solving the above problems. However, though this method prevents the increasing of the weight of the filled paper, the heat resistance, solvent resistance, and resistance against chemicals of the filled paper are not adequate. Also, the poor affinity of the hollow polymer particles with fibers causes lowering of the strength of the filled paper.

Meanwhile, with printed paper, a paper coating composition, containing an inorganic pigment and a binder component, is generally applied to improve the printing performance. However, the use of an inorganic pigment leads to such problems as the increasing of the weight of the paper, poor dispersion of the pigment in the coating composition, and the like.

The method of using hollow polymer particles in place of an inorganic pigment has been tried as a means of solving this problem. Though the use of hollow polymer particles can prevent the increasing of the weight of the paper, since the affinity with the paper and the affinity with the binder component are inadequate, the hollow polymer particles are poor in terms of uniformity of dispersion in the coating composition, and as result, the performance of the coated surface of the paper is lowered.

Also, the surface of a coated paper that uses hollow polymer particles as the pigment has poor heat resistance, which causes degrading of the quality of the coated paper in the drying process, and the like.

SUMMARY OF THE INVENTION (1) Cationic Hollow Crosslinked Polymer Particles and Production Method Thereof An object of the present invention is to provide cationic hollow crosslinked polymer particles that maintain a cationic property over a wide pH range, has adequate strength, and is favorable for use in filled paper, pigments for coating paper, additives for paints, fillers for resins, rubbers, and the like. Another object of the present invention is to provide a method of producing the abovementioned cationic hollow crosslinked polymer particles with excellent characteristics in a stable manner.

Upon carrying out research in order to achieve the above objects, the present inventors have found that by combining the use of specific monomers, the use of the monomers in specific proportions, the use of specific radical polymerization initiators, the abovementioned cationic hollow crosslinked polymer particles with excellent characteristics can be produced in a stable manner and have thus come to complete the present invention.

That is, with the present invention, the above objects of the invention are achieved by the provision of first cationic hollow crosslinked polymer particles of a first aspect described by the following constructions and second cationic hollow crosslinked polymer particles of a second aspect described by the following constructions and production methods for these particles. The first and second cationic hollow crosslinked polymer particles shall also be referred to collectively as simply, "cationic hollow crosslinked polymer particles."

(i) The First Cationic Hollow Crosslinked Polymer Particles and Production Method Thereof 1. Hollow crosslinked polymer particles characterized in that (I) the zeta potential as measured in an aqueous medium of pH 2 to 9 is in the range of +5 to +100 mV, (II) the volume hollowness is in the range of 1 to 80%, and (III) the average particle diameter is in the range of 0.03 to 10 $\mu$m.

2. A method of producing the cationic hollow crosslinked polymer particles of 1 above, which is a method of producing cationic hollow crosslinked polymer particles characterized in that (a) 1 to 99.99 weight % of a crosslinking monomer, (b) 0.01 to 15 weight % of a cationic monomer, and (c) 0 to 98.99 weight % of a copolymerizable monomer that is non-crosslinking and nonionic (the total amount of the monomers being 100 weight %) are polymerized under the presence of polymer particles that are swellable by at least one of the above monomers (this method shall be referred to hereinafter as "production method (I)").

3. A method of producing the cationic hollow crosslinked polymer particles of 1 above, which is a method of producing cationic hollow crosslinked polymer particles characterized in that (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) are polymerized using a radical polymerization initiator with a cationic group and under the presence of polymer particles that are swellable by at least one of the above monomers (this method shall be referred to hereinafter as "production method (II)").

4. A method of producing the cationic hollow crosslinked polymer particles of 1 above, which is a method of producing cationic hollow crosslinked polymer particles characterized in that (1) (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) are polymerized under the presence of polymer particles that are swellable by at least one of the above monomers, and (2) the abovementioned polymer particles are polymer particles obtained by polymerizing (a) 0.01 to 15 weight % of a cationic monomer and (d) 85 to 99.99 weight % of a nonionic monomer that is copolymerizable with the abovementioned cationic monomer (the total amount of the monomers being 100 weight %) (this method shall be referred to hereinafter as "production method (III)").

5. A method of producing the cationic hollow crosslinked polymer particles of 1 above, which is a method of producing cationic hollow crosslinked polymer particles characterized in that (1) (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) are polymerized under the presence of polymer particles that are swellable by at least one of the above monomers, and (2) the abovementioned polymer particles are polymer particles obtained by polymerizing (a) 0 to 15 weight % of a cationic monomer and (d) 85 to 100 weight % of a nonionic monomer that is copolymerizable with the abovementioned cationic monomer (the total amount of the monomers being 100 weight %) using a radical polymerization initiator with a cationic group (this method shall be referred to hereinafter as "production method (IV)").

(ii) The Second Cationic Hollow Crosslinked Polymer Particles and Production Method Thereof 1. Hollow crosslinked polymer particles characterized in that (I) the zeta potential as measured in an aqueous medium of pH 2 to 9 is in the range of +5 to +100 mV, (II) the volume hollowness is in the range of 1 to 80%, (III) the average particle diameter is in the range of 0.03 to 10 μm, and (IV) being comprised by 5 to 90 weight % of structural units derived from a crosslinking monomer and 95 to 10 weight % of structural units derived from another monomer that is copolymerizable with the abovementioned crosslinking monomer (the total amount of the two types of structural units being 100 weight %).

2. A method of producing the cationic hollow crosslinked polymer particles of 1 above, which is a method of producing cationic hollow crosslinked polymer particles characterized in that (a) 5 to 90 weight % of a crosslinking monomer, (b) 0.01 to 15 weight % of a cationic monomer, and (c) 9.99 to 94.99 weight % of a copolymerizable monomer that is non-crosslinking and nonionic (the total amount of the monomers being 100 weight %) are polymerized under the presence of polymer particles that are swellable by at least one of the above monomers (this method shall be referred to hereinafter as "production method (V)").

3. A method of producing the cationic hollow crosslinked polymer particles of 1 above, which is a method of producing cationic hollow crosslinked polymer particles characterized in that (a) 5 to 90 weight % of a crosslinking monomer, (b) 0 to 15 weight % of a cationic monomer, and (c) 10 to 95 weight % of a copolymerizable monomer that is non-crosslinking and nonionic (the total amount of the monomers being 100 weight %) are polymerized using a radical polymerization initiator with a cationic group and under the presence of polymer particles that are swellable by at least one of the above monomers (this method shall be referred to hereinafter as "production method (VI)").

4. A method of producing the cationic hollow crosslinked polymer particles of 1 above, which is a method of producing cationic hollow crosslinked polymer particles characterized in that (1) (a) 5 to 90 weight % of a crosslinking monomer, (b) 0 to 15 weight % of a cationic monomer, and (c) 10 to 95 weight % of a copolymerizable monomer that is non-crosslinking and nonionic (the total amount of the monomers being 100 weight %) are polymerized under the presence of polymer particles that are swellable by at least one of the above monomers, and (2) the abovementioned polymer particles are polymer particles obtained by polymerizing (b) 0.01 to 30 weight % of a cationic monomer and (d) 70 to 99.99 weight % of a nonionic monomer that is copolymerizable with the abovementioned cationic monomer (the total amount of the monomers being 100 weight %) (this method shall be referred to hereinafter as "production method (VII)").

5. A method of producing the cationic hollow crosslinked polymer particles of 1 above, which is a method of producing cationic hollow crosslinked polymer particles characterized in that (1) (a) 5 to 90 weight % of a crosslinking monomer, (b) 0 to 15 weight % of a cationic monomer, and (c) 10 to 95 weight % of a copolymerizable monomer that is non-crosslinking and nonionic (the total amount of the monomers being 100 weight %) are polymerized using a radical polymerization initiator under the presence of polymer particles that are swellable by at least one of the above monomers, (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and (3) the radical polymerization initiator or initiators of one or both of (1) and (2) above is or are a radical initiator or initiators having a cationic group or groups (this method shall be referred to hereinafter as "production method (VIII)").

(iii) The cationic hollow crosslinked polymer particles of the present invention maintain a cationic property over a wide pH range, have adequate strength, and can be used favorably in filled paper, pigment for paper coating, additive for paints, filler for resins, rubbers, and the like.

By the production methods of the present invention, the above-described cationic hollow crosslinked polymer particles with the abovementioned excellent characteristics can be produced in a stable manner.

(2) Paint Composition

An object of the present invention is to provide a paint composition, which uses a cationic polymer as the binder component, is excellent in preservation stability, and can form a lightweight coat with a high hiding property.

To achieve the above object, the present invention provides a first paint composition of a first aspect described by the following constructions and a second paint composition of a second aspect described by the following constructions. The first and second paint compositions shall also be referred to collectively as simply, "paint compositions."

(i) First Composition

1. A paint compositionA characterized in containing

[1] cationic hollow crosslinked polymer particles, with which the zeta potential as measured in an aqueous medium with a pH of 2 to 9 is in the range of +5 to +100 mV, and

[2] a film-forming cationic polymer.

2. A paint composition as defined in 1 above, wherein the cationic hollow crosslinked polymer particles are comprised by 5 to 90 weight of structural units derived from a crosslinking monomer and 95 to 10 weight % of structural units derived from another monomer that is copolymerizable with the abovementioned crosslinking monomer (the total amount of the two types of structural units being 100 weight %).

3. A paint composition as defined in 1 above, wherein the cationic hollow crosslinked polymer particles are produced by (1) polymerizing (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) using a radical polymerization initiator and under the presence of polymer particles that are swellable by at least one of the above monomers, (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and (3) the radical polymerization initiator or initiators of one or both of (1) and (2) above is or are a radical initiator or initiators having a cationic group or groups.

(ii) Second Paint Composition

By another aspect of the present invention, the second paint composition of the following constructions is provided to achieve the above-described object.

1. A paint composition characterized in containing
   [1] cationic hollow crosslinked polymer particles, with which
   (I) the zeta potential as measured in an aqueous medium with a pH of 2 to 9 is in the range of +5 to +100 mV,
   (II) the volume hollowness is in the range of 1 to 80%, and
   (III) the average particle diameter is in the range of 0.03 to 10 µm, and
   [2] a film-forming cationic polymer.

2. A paint composition as defined in 1 above, wherein the cationic hollow crosslinked polymer particles are produced by
   (1) polymerizing (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) using a radical polymerization initiator having a cationic group and under the presence of polymer particles that are swellable by at least one of the above monomers, and
   (2) the abovementioned polymer particles are polymer particles obtained by polymerizing (a) 0 to 15 weight % of a cationic monomer and (d) 85 to 100 weight % of a nonionic monomer that is copolymerizable with the abovementioned cationic monomer (the total amount of the monomers being 100 weight %) using a radical polymerization initiator containing a cationic group.

Since the cationic hollow crosslinked polymer particles of the present invention's paint compositions described above maintain a cationic property over a wide pH range and have solvent resistance and heat resistance based on the crosslinked structure, the present invention's paint compositions that use a film-forming cationic polymer as the binder component are excellent in preservation stability, can form a coat that is lightweight and high in hiding property, and can be used in a wide variety of fields.

(iii) With the paint compositions of the present invention, the cationic hollow crosslinked polymer particles contained therein maintain a cationic property over a wide pH range and a cationic polymer can be used as the binder component without lowering the preservation stability. Thus, when for example a paint composition of the present invention is used as the topcoat of a painted surface having an anionic substrate, a coat that is excellent in adhesion with the substrate surface is formed, excellent coat performance is provided, and since the abovementioned hollow particles have a crosslinked structure, a coat that is lightweight and high in hiding property can be formed.

(3) Cationic Electrodeposition Paint Composition

An object of the present invention is to provide a cationic electrodeposition paint composition that exhibits excellent stability as an electrodeposition paint. Another object of the present invention is to provide a cationic electrodeposition paint composition that can form a lightweight coat with a high hiding property.

With the present invention, the above objects are achieved by the provision of cationic electrodeposition paint compositions of the following constructions.

1. A cationic electrodeposition paint composition characterized in containing
   [1] cationic hollow crosslinked polymer particles, with which the zeta potential as measured in an aqueous medium with a pH of 2 to 9 is in the range of +5 to +100 mV, and
   [2] a film-forming cationic polymer.

2. A cationic electrodeposition paint composition as defined in claim 1, wherein the cationic hollow crosslinked polymer particles are comprised by 5 to 90 weight % of structural units derived from a crosslinking monomer and 95 to 10 weight % of structural units derived from another monomer that is copolymerizable with the abovementioned crosslinking monomer (the total amount of the two types of structural units being 100 weight %).

3. A cationic electrodeposition paint composition as defined in claim 1, wherein the cationic hollow crosslinked polymer particles are produced by
   (1) polymerizing (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) using a radical polymerization initiator and under the presence of polymer particles that are swellable by at least one of the above monomers,
   (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and
   (3) the radical polymerization initiator or initiators of one or both of (1) and (2) above is or are a radical initiator or initiators having a cationic group or groups.

The cationic electrodeposition paint compositions of the present invention exhibit excellent stability as electrodeposition paints and can form a coat that is lightweight and high in hiding property. The electrodeposition paint compositions of the present invention can thus be used favorably as primers, ornamental paints, and insulating paints for automobile bodies, automobile parts, interior goods, building materials, household electrical products, electronic materials, and the like.

(4) Resin Composition

An object of the present invention is to provide a resin composition with which a whitened or opaque molded product that is high in rigidity can be obtained without compromising the inherent lightweightness, excellent mechanical characteristics, and optical characteristics (surface gloss and color tone) of the resin material.

With the present invention, the above objects are achieved by the provision of resin compositions of the following constructions.

1. A resin composition characterized in that cationic hollow crosslinked polymer particles, with which the zeta potential as measured in an aqueous medium with a pH of 2 to 9 is in the range of +5 to +100 mV, are contained in the resin.

2. A resin composition as defined in 1 above, wherein the cationic hollow crosslinked polymer particles are comprised by 5 to 90 weight % of structural units derived from a crosslinking monomer and 95 to 10 weight % of structural units derived from another monomer that is copolymerizable with the abovementioned crosslinking monomer (the total amount of the two types of structural units being 100 weight %).

3. A resin paint composition as defined in 1 above, wherein the cationic hollow crosslinked polymer particles are produced by
   (1) polymerizing (a) 1 to 100 weight % of a crosslinking monomer, (b) 0 to 15 weight % of a cationic monomer, and (c) 0 to 99 weight % of a copolymerizable monomer that is non-crosslinking and nonionic (the total amount of the monomers being 100 weight %) using a radical polymerization initiator and under the presence of polymer particles that are swellable by at least one of the above monomers,
   (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and
   (3) the radical polymerization initiator or initiators of one or both of (1) and (2) above is or are a radical initiator or initiators having a cationic group or groups.

With the resin composition by the present invention, since cationic hollow crosslinked polymer particles are blended in a resin material that is generally anionic, a strong interaction occurs between the two components, and as a result, a whitened or opaque molded product that is high in rigidity can be obtained without compromising the inherent lightweightness, excellent mechanical characteristics, and optical characteristics (surface gloss and color tone) of the resin material.

Also, since the cationic hollow crosslinked polymer particles that are blended in the resin composition of the present invention maintain a cationic property over a wide pH range, the molded product obtained from the resin composition of the present invention will be cationic, and thus be excellent in fabricability, that is, for example, enable the painting of the molded product surface favorably, and the like, and enable the provision of an antistatic property to the surface of the molded product over a long period of time.

(5) Filled Paper, Paper Coating Composition, and Coated Paper

An object of the present invention is to provide high-quality filled paper, which uses as the filler, hollow polymer particles that are lightweight and excellent in the affinity with the fibers of the filled paper, and is yet excellent in strength, heat resistance, resistance against chemicals, solvent resistance, and the like.

Another object of the present invention is to provide a paper coating composition and coated paper, which use as the pigment, hollow polymer particles that are lightweight and excellent in the affinity with the fibers of paper, and by which high-quality coated paper with a surface that is excellent in heat resistance can be obtained.

With the present invention, the above objects are achieved by the provision of filled paper, paper coating compositions, and coated paper of the following constructions.

1. Filled paper characterized in containing cationic hollow crosslinked polymer particles, with which (I) the zeta potential as measured in an aqueous medium with a pH of 2 to 9 is in the range of +5 to +100 mV and
   (IV) are comprised by 5 to 90 weight % of structural units derived from a crosslinking monomer and 95 to 10 weight % of structural units derived from another monomer that is copolymerizable with the abovementioned crosslinking monomer (the total amount of the two types of structural units being 100 weight %).

2. Filled paper as defined in 1 above, wherein the cationic hollow crosslinked polymer particles are produced by
   (1) polymerizing (a) 5 to 100 weight % of a crosslinking monomer, (b) 0 to 15 weight % of a cationic monomer, and (c) 0 to 95 weight % of a copolymerizable monomer that is non-crosslinking and nonionic (the total amount of the monomers being 100 weight %) using a radical polymerization initiator and under the presence of polymer particles that are swellable by at least one of the above monomers,
   (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and
   (3) the radical polymerization initiator or initiators of one or both of (1) and (2) above is or are a radical initiator or initiators having a cationic group or groups.

3. A paper coating composition characterized in containing
   (A) cationic hollow crosslinked polymer particles, with which (I) the zeta potential as measured in an aqueous medium with a pH of 2 to 9 is in the range of +5 to +100 mV and
   (IV) are comprised by 5 to 90 weight % of structural units derived from a crosslinking monomer and 95 to 10 weight % of structural units derived from another monomer that is copolymerizable with the abovementioned crosslinking monomer (the total amount of the two types of structural units being 100 weight %), and
   (B) a binder component.

4. A paper coating composition as defined in 3 above, wherein the cationic hollow crosslinked polymer particles are produced by
   (1) polymerizing (a) 5 to 100 weight % of a crosslinking monomer, (b) 0 to 15 weight % of a cationic monomer, and (c) 0 to 95 weight % of a copolymerizable monomer that is non-crosslinking and nonionic (the total amount of the monomers being 100 weight %) using a radical polymerization initiator and under the presence of polymer particles that are swellable by at least one of the above monomers,
   (2) the abovementioned polymer particles are polymer particles obtained by polymerizing (b) 0 to 30 weight % of a cationic monomer and (d) 70 to 100 weight % of a nonionic monomer that is copolymerizable with the abovementioned cationic monomer (the total amount of the monomers being 100 weight %) using a radical polymerization initiator, and
   (3) the radical polymerization initiator or initiators of one or both of (1) and (2) above is or are a radical initiator or initiators having a cationic group or groups.

5. Coated paper characterized in being coated with a paper coating composition as defined in 3 or 4 above.

DETAILED DESCRIPTION OF THE INVENTION

The present invention shall now be described in further detail.

(1) Cationic hollow crosslinked polymer particles and production method thereof

First, with the first cationic hollow crosslinked polymer particles of the first aspect of the present invention (shall also be referred to hereinafter simply as "hollow crosslinked particles" or "the first hollow crosslinked particles"), (I) the zeta potential as measured in an aqueous medium of pH 2 to 9 is in the range of +5 to +100 mV and preferably +10 to +60 mV, (II) the volume hollowness is in the range of 1 to 80% and preferably 3 to 40%, and (III) the average particle diameter is in the range of 0.03 to 10 $\mu$m and preferably 0.1 to 5 $\mu$m.

With the second cationic hollow crosslinked polymer particles of the second aspect of the present invention (shall also be referred to hereinafter simply as "hollow crosslinked particles" or "the second hollow crosslinked particles"), (I) the zeta potential as measured in an aqueous medium of pH 2 to 9 is in the range of +5 to +100 mV and preferably +10 to +60 mV, (II) the volume hollowness is in the range of 1 to 80% and preferably 3 to 40%, (III) the average particle diameter is in the range of 0.03 to 10 $\mu$m and preferably 0.1 to 5 $\mu$m, and (IV) the particles are comprised by 5 to 90 weight %, preferably 10 to 60 weight %, and more preferably 15 to 50 weight % of structural units derived from a crosslinking monomer and 95 to 10 weight %, preferably 40 to 90 weight %, and more preferably 50 to 85% of structural units derived from another monomer that is copolymerizable with the abovementioned crosslinking monomer (the total amount of the two types of structural units being 100 weight %).

As has been mentioned above, the hollow crosslinked particles of the present invention are comprised by 5 to 90 weight % of structural units derived from a crosslinking monomer and 95 to 10 weight % of structural units derived from another monomer that is copolymerizable with the abovementioned crosslinking monomer.

That structures derived from a crosslinking monomer exists in the abovementioned range in the hollow crosslinked particles signify that the hollow crosslinked particles possess many crosslinked structures and thus that the hollow crosslinked particles B of the present invention will have good strength and heat resistance. Such favorable results cannot be obtained if the amount of the structures derived from the crosslinking monomer is less than 5 weight %.

Here, the proportion of the structural units derived from the crosslinking monomer and the proportion of the structural units derived from the other monomer are average values for the total polymer that make up the hollow crosslinked particles. For example, in the above-described production methods ((V) to (VIII)), which are favorable methods for obtaining the hollow crosslinked particles, the above proportions are calculated as the average values for the polymer of the swellable polymer particles and the polymer resulting from the polymerization carried out under the presence of the abovementioned swellable polymer particles.

With the above-described first and second hollow crosslinked particles of the present invention (shall also be referred to simply as "hollow crosslinked particles" in cases where both types of particles are referred to), the zeta potential is an indicator that expresses the ionicity of the particles, and that the zeta potential of the hollow crosslinked particles of the present invention lies in the abovementioned range indicates that the hollow crosslinked particles are cationic in a wide range of acidic to basic environments. That is, the hollow crosslinked particles express a strong binding force with an anionic matrix in a wide range of acidic to basic surroundings.

The zeta potential of the hollow crosslinked particles of the present invention is measured by the following method.

(Zeta potential measurement method)

An aqueous dispersion of the particles is diluted with a 0.1 normal aqueous potassium chloride solution so that the particle solids concentration will be 0.1 weight %, the diluted dispersion is adjusted to pH's of 2, 6, and 9 using hydrochloric acid or potassium hydroxide, and the zeta potentials at the respective pH's are measured by a laser Doppler zeta potential analyzer.

The volume hollowness is the volumetric proportion taken up by the void in each particle. If the volume hollowness is less than 1%, the particles will practically not function as hollow crosslinked particles. A volume hollowness in the excess of 80% is not favorable since the strength will be lowered.

With the present invention, the volume hollowness is measured by the following method.

(Volume Hollowness Measurement Method)

An aqueous dispersion of the particles is diluted with distilled water so that the particle solids concentration will be 0.1 weight %, this diluted dispersion is dropped onto a copper mesh provided with a collodion membrane and then dried, the dried dispersion is photographed using a transmission electron microscope, the inner and outer diameters of 100 hollow particles are measured from the photograph thus obtained, and the volume hollowness is determined as the cube of the ratio of the average inner diameter to the average outer diameter that have been obtained.

As has been mentioned above, the hollow crosslinked particles of the present invention have an average particle diameter in the range of 0.03 to 10 $\mu$m and are micro particulate. When the particle diameter is in this range, favorable results can be obtained in terms of dispersion in a matrix, strength, and stability of aqueous dispersion. Hollow crosslinked particles of an average particle diameter of less than 0.03 $\mu$m are difficult to obtain in terms of production and an average particle diameter in the excess of 10 $\mu$m is unfavorable as the aqueous dispersion will then be unstable.

With the present invention, the average particle diameter is measured by the following method.

(Average Particle Diameter Measurement Method)

An aqueous dispersion of the particles is diluted suitably with distilled water and the average particle diameter is measured using a dynamic light scattering particle sizer.

Since the cationic hollow crosslinked polymer particles of the present invention express a strong binding force with an anionic matrix in a wide range of acidic to basic surroundings and have adequate strength and dispersion properties, they are excellent as fillers for filled paper, pigments for coating, additives for paints, and fillers for resins and rubbers.

It is furthermore preferable for the hollow crosslinked particles of the present invention to have the following characteristics.

First, the hollow crosslinked particles preferably has solvent resistance against organic solvents, such as toluene, alcohol, and the like. By having solvent resistance, an advantage is provided in that the shapes of the particles will be maintained when the particles are used as an additive to a paint or as a filler in a resin. To be more specific, the parts dissolved in toluene at 25° C. is preferably 10% or less.

Furthermore, the hollow crosslinked particles preferably has heat resistance. By having heat resistance, an advantage is provided in that the shapes of the particles will be maintained even in a high temperature dispersion process that is carried out in using the particles as a filler. To be more specific, the 10% mass reduction temperature as measured by a heat balance (TGA) is preferably 240° C. or more.

Such solvent resistance and heat resistance can be expressed by suitable selection of the monomer species.

Examples of the polymers that comprise the present invention's cationic hollow crosslinked polymer particles include thermoplastic resins and thermosetting resins, such as acrylic resins, polystyrene resins, polyolefin resins, polyester resins, polycarbonate resins, polyurethane resins, phenol resins, epoxy resins, ionomer resins, vinyl chloride resins, fluororesins, butadiene resins, and the like. It is essential for at least part of the abovementioned polymers that comprise the hollow crosslinked particles to have a cationic group.

With the present invention, cationic groups include amino groups and other groups that can bind with a proton to form a cation and groups that form the cationic part of salts resulting from reactions of the abovementioned groups with an acid.

Specific examples of cationic groups include primary amino groups, secondary amino groups, tertiary amino groups; quaternary amino groups, secondary imino groups, tertiary imino groups, quaternaryimino groups; amidino groups, imidino groups, and hydrazino groups of various valences; the pyridyl group and other annular groups that contain a nitrogen atom, and the like.

The concentration of the cationic groups in the hollow crosslinked particles of the present invention is preferably 0.05 to 300 mmol per 100 g of particles and more preferably 1 to 100 mmol per 100 g of particles.

(1-2) Methods of Producing Cationic Hollow Crosslinked Polymer Particles

Though not restricted in particular, the above-described production methods (I) to (IV) are favorable as methods of producing the above-described first cationic hollow crosslinked polymer particles of the present invention. Though also not restricted in particular, the above-described production methods (V) to (VII) are favorable as methods of producing the above-described second cationic hollow crosslinked polymer particles of the present invention. These methods shall be described below.

(i) Monomers and Radical Polymerization Initiator

First, the monomers of (a) to (d) and the radical polymerization initiator with cationic group, and the like, that are used in the production methods (I) to (IV) and (V) to (VIII) shall be described in detail.

<Monomers>

(a) Crosslinking Monomer

Examples of the crosslinking monomer include divinyl monomers, trivinyl monomers, and tetravinyl monomers, such as divinylbenzene, divinylbiphenyl, ethylene glycol di(meth)acrylate, diethylene glycol di(meth)acrylate, triethylene glycol di(meth)acrylate, tetraethylene glycol di(meth) acrylate, propylene glycol di(meth)acrylate, dipropylene glycol di(meth)acrylate, tripropylene glycol di(meth) acrylate, tetrapropylene glycol di(meth)acrylate, 1,4-butanediol di(meth)acrylate, 1,6-hexanediol di(meth) acrylate, neopentyl glycol di(meth)acrylate, 2,2'-bis[4-(meth)acryloyloxypropioxyphenyl]propane, 2,2'-bis[4-(meth)acryloyloxydiethoxydiphenyl]propane, glycerin tri(meth)acrylate, trimethylolpropane tri(meth)acrylate, pentaerythritol tetra(meth)acrylate, and the like. Among the above, divinylbenzene, ethylene glycol dimethacrylate, and trimethylolpropane trimethacrylate are preferable.

One of the above monomers may be used singularly or two or more of the above may be used in combination.

(b) Cationic Monomer

Examples of the cationic monomer include aminoalkyl-group-containing (meth)acrylic esters, such as 2-dimethylaminoethyl (meth)acrylate, 2-diethylaminoethyl (meth)acrylate, 2-dimethylaminopropyl (meth)acrylate, 3-dimethylaminopropyl (meth)acrylate, and the like, and their quaternary salts with methylene chloride, dimethyl sulfate, diethyl sulfate, and the like.;

aminoalkoxyalkyl-group-containing (meth)acrylic esters, such as 2-(dimethylaminoethoxy)ethyl (meth)acrylate, 2-(diethylaminoethoxy)ethyl (meth)acrylate, 3-(dimethylaminoethoxy)propyl (meth)acrylate, and the like, and their quaternary salts with methylene chloride, dimethyl sulfate, diethyl sulfate, and the like.; and N-aminoalkyl-group-containing (meth)acrylamides, such as N-(2-dimethylaminoethyl) (meth)acrylamide, N-(2-diethylaminoethyl) (meth)acrylamide, N-(2-dimethylaminopropyl) (meth)acrylamide, N-(3-dimethylaminopropyl) (meth)acrylamide, and the like, and their quaternary salts with methylene chloride, dimethyl sulfate, diethyl sulfate, and the like. Among the above, 2-dimethylaminoethyl (meth)acrylate, N-(2-dimethylaminoethyl) (meth)acrylamide, and their quaternary salts with methylene chloride are preferable.

One of the above monomers may be used singularly or two or more of the above may be used in combination.

(c) Copolymerizable Monomer that is Non-Crosslinking and Nonionic

Here, the copolymerizable monomer (c) that is non-crosslinking and nonionic is a non-crosslinking, non-ionic monomer that can be copolymerized with either the above-mentioned crosslinking monomer (a) or cationic monomer (b).

Examples of such a monomer include aromatic vinyl monomers such as styrene, a-methylstyrene, p-methylstyrene, halogenated styrenes, and the like; unsaturated nitriles such as acrylonitrile and the like; acrylic esters and methacrylic esters, such as methyl acrylate, methyl methacrylate, ethyl acrylate, ethyl methacrylate, butyl acrylate, butyl methacrylate, cyclohexyl methacrylate, 2-ethylhexyl acrylate, 2-ethylhexyl methacrylate, lauryl acrylate, lauryl methacrylate, glycidyl acrylate, glycidyl methacrylate, 2-hydroxyethyl acrylate, 2-hydroxyethyl methacrylate, and the like; diolefins such as butadiene, isoprene, and the like; vinyl carboxylate such as vinyl acetate and the like; and halogenated vinylidenes sucu as vinyl chloride, vinylidene chloride, and the like. Among the above, styrene, α-methylstyrene, acrylonitrile, methyl methacrylate, butyl methacrylate, and 2-hydroxyethyl acrylate are preferable.

One of the above monomers may be used singularly or two or more of the above may be used in combination.

(d) Nonionic Monomer that is Copolymerizable with the Abovementioned Cationic Monomer of (b)

Besides satisfying the condition of being copolymerizable with the cationic monomer of (b), this monomer is the same as the above-described crosslinking monomer of (a) and the non-crosslinking, nonionic, copolymerizable monomer of (c). As specific examples, the monomers indicated as examples of the crosslinking monomer of (a) and the non-crosslinking, nonionic, copolymerizable monomer of (c) can be given as they are, with the inclusion of the preferable monomers. However, the crosslinking monomer is used as necessary in a range that will not obstruct the attainment of the objects of the present invention.

One of the above monomers may be used singularly or two or more of the above may be used in combination.

<Radical Polymerization Initiator with Cationic Group>

This radical polymerization initiator is such that the polymer that is obtained by radical polymerization using this initiator will have a cationic group, originating from the radical polymerization initiator, at the terminal.

Preferable radical polymerization initiators with cationic group include azobis type initiators having an amidino group, imidino group, or pyridium group. Also, initiators with which the 10-hour half-life temperature will be in the range of 40 to 95° C. are preferable since polymerization can then be performed under mild conditions.

Specific examples of preferable radical polymerization initiators with cationic group include those given below.

① 2,2'-azobis(2-methyl-N-phenylpropionamidine) dihydrochloride (sold under the trade name, VA-545, by Wako Pure Chemical Industries, Co. Ltd.)

② 2,2'-azobis[N-(4-chlorophenyl)-2-methylpropionamidine] dihydrochloride (sold under the trade name, VA-546, by Wako Pure Chemical Industries, Co. Ltd.)

③ 2,2'-azobis[N-(4-hydroxyphenyl)-2-methylpropionamidine] dihydrochloride (sold under the trade name, VA-548, by Wako Pure Chemical Industries, Co. Ltd.)

④ 2,2'-azobis[2-methyl-N-(phenylmethyl)-propionamidine] dihydrochloride (sold under the trade name, VA-552, by Wako Pure Chemical Industries, Co. Ltd.)

⑤ 2,2'-azobis[2-methyl-N-(2-propenyl)propionamidine] dihydrochloride (sold under the trade name, VA-553, by Wako Pure Chemical Industries, Co. Ltd.)

⑥ 2,2'-azobis(2-methylpropionamidine) dihydrochloride (sold under the trade name, V-50, by Wako Pure Chemical Industries, Co. Ltd.)

⑦ 2,2'-azobis[N-(2-hydroxyethyl)-2-methylpropionamidine] dihydrochloride (sold under the trade name, VA-558, by Wako Pure Chemical Industries, Co. Ltd.)

⑧ 2,2'-azobis[N-(2-carboxyethyl)-2-methylpropionamidine] hydrate (sold under the trade name, VA-057, by Wako Pure Chemical Industries, Co. Ltd.)

⑨ 2,2'-azobis[2-methyl-(5-methyl-2-imidazoline-2-yl) propane] dihydrochloride (sold under the trade name, VA-041, by Wako Pure Chemical Industries, Co. Ltd.)

⑩ 2,2'-azobis[2-(2-imidazoline-2-yl)propane] dihydrochloride (sold under the trade name, VA-044, by Wako Pure Chemical Industries, Co. Ltd.)

⑪ 2,2'-azobis[2-(4,5,6,7-tetrahydro-1H-1,3-diazepine-2-yl)pr opane] dihydrochloride (sold under the trade name, VA-054, by Wako Pure Chemical Industries, Co. Ltd.)

⑫ 2,2'-azobis[2-(3,4,5,6-tetrahydropyrimidine-2-yl) propane] dihydrochloride (sold under the trade name, VA-058, by Wako Pure Chemical Industries, Co. Ltd.)

⑬ 2,2'-azobis [2-(5-hydroxy-3,4,5,6-tetrahydropyrimidine-2-yl)propane] dihydrochloride (sold under the trade name, VA-059, by Wako Pure Chemical Industries, Co. Ltd.)

⑭ 2,2'-azobis{2-[1-(2-hydroxyethyl)-2-imidazoline-2-yl]propa ne} dihydrochloride (sold under the trade name, VA-060, by Wako Pure Chemical Industries, Co. Ltd.)

⑮ 2,2'-azobis[2-(2-imidazoline-2-yl) propane] (sold under the trade name, VA-061, by Wako Pure Chemical Industries, Ltd.)

Among the above, the use of 2,2'-azobis(2-methylpropionamidine) dihydrochloride (V-50), 2,2'-azobis[N-2-carboxyethyl]-2-methylpropionamidine] hydrate (VA-057), or 2,2'-azobis[2-(2-imidazoline-2-yl)propane] dihydrochloride (VA-044) is preferable.

(ii) Production Methods (I) to (IV)

The production methods (I) to (IV) for producing the present invention's cationic hollow crosslinked polymer particles shall now be described.

<Production Method (I)>

With this method (I), hollow crosslinked particles are produced by polymerizing (a) 1 to 99.99 weight % and preferably 10 to 50 weight % of a crosslinking monomer, (b) 0.01 to 15 weight % and preferably 0.5 to 5 weight % of a cationic monomer, and (c) 0 to 98.99 weight % and preferably 45 to 89.5 weight % of a copolymerizable monomer that is non-crosslinking and nonionic (the total amount of the monomers being 100 weight %) under the presence of polymer particles that are swellable by at least one of the above monomers (shall also be referred to hereinafter simply as "swellable polymer particles") and preferably in an aqueous medium.

With the above method, though the mechanism by which the hollow crosslinked particles are formed is not necessarily clear, it is considered for example that by making the swellable polymer particles be present along with the crosslinking monomer and the other polymerizing monomers in an aqueous medium, the changes in volume, which occur when the monomers that have permeated inside the swellable polymer particles polymerize and are converted into polymers, occur effectively, and as a result, a void is formed inside the crosslinked polymer so that a hollow body is formed by the crosslinked polymer. On the other hand, voids are not formed when swellable polymer particles are not present.

This assumption is considered to apply not only to production method (I) but also to the other production methods (II) to (IV).

With this method, if the usage amount of the crosslinking monomer (a) is less than 1 weight % and excessively low, the strength of the particles during polymerization will be inadequate, causing each particle to shrink as a whole, and due to inadequate distortion by polymerization shrinkage of the particle interiors, inner voids are prevented from being formed or the strength is made too small even if polymer particles with inner voids are formed, and the like. If the usage amount of the crosslinking monomer (a) exceeds 99.99 weight % and is excessively high, the usage amount of the cationic monomer (b) will be small, and the hollow crosslinked particles that are obtained will be low in cationic property.

The usage amount of the crosslinking monomer (a) is calculated as the amount of pure product obtained by subtracting the amounts of inert solvents and monofunctional, non-crosslinking monomer components that are contained in the crosslinking monomer material that is normally sold.

If the usage amount of the cationic monomer (b) is less than 0.01 weight % and excessively low, the cationic property of the hollow crosslinked particles obtained will be low and the abovementioned condition concerning the zeta potential will not be satisfied. On the other hand, an excessively high usage amount of the cationic monomer in the excess of 15 weight % is unfavorable as aggregates will be produced during polymerization.

The non-crosslinking, nonionic, copolymerizable monomer (c) is a monomer that is arbitrarily used as suited to change the hydrophilicity or to improve the heat resistance. If the usage amount of this monomer exceeds 98.99% and is excessively high, the usage amounts of the crosslinking monomer (a) and the cationic monomer (b) will become low and the strength and cationic property of the polymer particles that are obtained will be low.

With the present invention, "swellable by monomer" means that the polymer particles can absorb the monomer, and this expression is used inclusively in cases where the monomer can dissolve the polymer particles.

At least one type of polymer selected from among styrene homopolymers and styrene copolymers is preferably used as the polymer that comprises the above-described swellable polymer particles. Examples of such styrene copolymers include copolymers of styrene with at least one type of monomer selected from among acrylic esters, methacrylic esters, and acrylonitrile.

Among the above, styrene homopolymers and styrene copolymers, containing 50 weight % or more of the styrene component, are especially preferable.

The usage amount of the swellable polymer particles is 1 to 100 weight parts, preferably 2 to 50 weight parts, and more preferably 5 to 20 weight parts per 100 weight parts of the total usage amount of the crosslinking monomer (a), the cationic monomer (b), and the non-crosslinking, nonionic, copolymerizable monomer (c) used in the polymerization. If the usage amount of the swellable polymer particles is less than 1 weight %, the volume hollowness will be small. On the other hand, a usage amount of the swellable polymer that is greater than 100 weight parts will only restrict the formation of voids.

For carrying out polymerization with the swellable polymer particles being present in an aqueous dispersion, the method, in which polymerization is carried out after making the swellable polymer particles swollen by any of the above-described polymerizing monomers of (a), (b), or (c) with the swellable polymer particles being dispersed in the aqueous medium, can be employed favorably.

In this case, it is extremely preferable for the swellable polymer particles to act as seed polymer particles and for any of the abovementioned polymerizing monomers to swell the particles well. Thus the polymer that comprises the swellable polymer particles is preferably small in molecular weight and for example, the number average molecular weight of this polymer is 20000 or less, preferably 10000 or less, and more preferably 700 to 7000.

Here, the number average molecular weight is the value measured by dissolving the swellable polymer particles in a good solvent for the polymer particles and making measurements by gel permeation chromatography (GPC) using the solution that is obtained.

If the number average molecular weight of the swellable polymer particles is greater than 20000, many of the monomers will not swell the swellable polymer particles and these monomers will polymerize separately from the swellable polymer particles in the aqueous dispersion, resulting in the formation of large amounts of microparticles that will not be polymer particles with inner voids and also making the polymerization system unstable.

The average particle diameter of the swellable polymer particles to be used as the seed polymer particles is preferably 30 to 80% of the average particle diameter (outer diameter) of the cationic hollow crosslinked polymer particles of the present invention.

The particle diameter of a polymer particle with a void, which is obtained by polymerization using a swellable polymer particle, is approximately equivalent to the particle diameter of the swellable polymer particle when it is swelled and enlarged by the polymerizing monomers. Thus by adjusting the particle diameter of the swellable polymer particles, the usage amount of the swellable polymer particles with respect to the polymerizing monomers, and the like, the particle diameter of the hollow crosslinked particles to be produced can be controlled.

To be more specific, in order to obtain hollow crosslinked particles of 0.06 to 0.6 $\mu$m particle diameter, which are excellent in whiteness and hiding property, swellable polymer particles of 0.03 to 0.40 $\mu$m particle diameter should be used.

The method of preparing such swellable polymer particles is not restricted in particular, and for example, the emulsion polymerization method, suspension polymerization method, or other polymerization method in which a relatively large amount of chain transfer agent is used can be employed.

The polymerization of the monomers (a) to (c), which is to be carried out under the presence of the swellable polymer particles, is preferably carried out by the emulsion polymerization method or suspension polymerization method in an aqueous medium.

In the above polymerization, a surfactant or an organic or inorganic suspension stabilizer that is used ordinarily in polymerization can be used.

Generally, a surfactant is used mainly to produce hollow crosslinked polymer particles with an average particle diameter of less than 1 $\mu$m, and a suspension stabilizer is used mainly to produce hollow crosslinked polymer particles with an average particle diameter of 1 $\mu$m or more.

As the abovementioned surfactant,
- a cationic surfactant, such as an alkylamine (salt), polyoxyethylene alkylamine (salt), quaternary alkylammonium salt, alkylpyridinium salt, and the like,
- an ampholytic surfactant, such as dodecyldimethyl betaine, alkylimidazolinium betaine, and the like,
- a nonionic surfactant, such as a polyoxyethylene alkyl ether, polyoxyethylene alkylphenyl ether, ethylene oxide adduct derivative of a formalin condensate of an alkyl phenol, polyoxyethylene glycerin aliphatic acid ester, polyoxyethylene sorbitan aliphatic acid ester, aliphatic acid alkanolamide, polyoxyethylene aliphatic acid amide, reactive emulsifier having polyoxyethylene as the hydrophilic group ("Adekalia Soap NE-20," made by Asahi Denka Kogyo Corp., "Aquaron RN-20," made by Dai-Ichi Kogyo Seiyaku Co,. Ltd.), and the like, or
- a combination system of the above. The solitary use of an anionic surfactant is not suitable for the present invention since this will tend to give rise to aggregates during polymerization.

Examples of the abovementioned organic suspension stabilizer include synthetic hydrophilic polymer substances, such as polyvinyl alcohol, polyvinyl pyrrolidone, polyethylene glycol, and the like, natural hydrophilic polymer substances, such as gelatin, water-soluble starch, and the like, and semi-synthetic hydrophilic polymer substances, such as carboxymethylcellulose, and the like.

Examples of the abovementioned inorganic suspension stabilizer include phosphate salts of magnesium, barium, calcium, and the like, calcium carbonate, magnesium carbonate, zinc oxide, aluminum oxide, aluminum hydroxide, and the like.

An oil-soluble polymerization initiator or a water-soluble polymerization initiator may be used as the polymerization initiator.

A water-soluble polymerization initiator is preferably used to carry out polymerization for production of hollow crosslinked particles with a particle diameter of 1 μm or less, and the polymerization of large-diameter monomer liquid drops, which do not swell into hollow crosslinked particles, can be prevented thereby.

If polymerization for production of hollow crosslinked particles with a particle diameter of greater than 1 μm is to be carried out, the use of an oil-soluble polymerization initiator is preferable for preventing the formation of unneeded polymer particles without voids.

Examples of the abovementioned water-soluble polymerization initiator include redox system initiators, such as persulfates or hydrogen peroxide—ferrous chloride and cumene hydroperoxide—sodium ascorbate.

Examples of the abovementioned oil-soluble polymerization initiator include benzoyl peroxide, lauroyl peroxide, t-butylperoxy-2-ethyl hexanoate, azobisisobutyronitrile, and the like.

An abovementioned radical polymerization initiator with cationic group may also be used.

Depending on the combination of the monomers (a), (b), and (c), the polymerization rate may be high, and in this case, if so-called lump polymerization is carried out using a large polymerization container and by putting all of the polymerization components in the polymerization container, the control of the polymerization temperature will be difficult and there is danger of letting the polymerization reaction run out of control. Thus normally in order to avoid such danger, the so-called incremented polymerization, in which the monomer components are supplied as they are or in the form of an emulsion and the like, into the polymerization container in a continuous or divided manner, may be employed.

After polymerization, the present invention's cationic hollow crosslinked polymer particles with voids in the interior can be obtained by separating the hollow crosslinked particles from the aqueous dispersion and then drying.

With the production method (I) of the present invention, cationic hollow crosslinked polymer particles that are hollow bodies, each having a single void and having, for example, an average outer diameter (average particle diameter) of 0.03 to 10 μm and an inner diameter of 0.2 to 0.95 times the outer diameter, can be obtained. This is the same for production methods (II) to (IV) as well.

Such a production method (I) can be used favorably for producing hollow crosslinked particles with an especially large number of cationic groups.

<Production Method (II)>

With production method (II), polymerization is carried out using a radical polymerization initiator with a cationic group to add cationic property to the hollow crosslinked particles that are obtained.

(a) 1 to 100 weight % and preferably 10 to 50 weight % of a crosslinking monomer, (b) 0 to 15 weight % and preferably 0 to 5 weight % of a cationic monomer, and (c) 0 to 99 weight % and preferably 45 to 90 weight % of a copolymerizable monomer that is non-crosslinking and non-ionic (the total amount of the monomers being 100 weight %) are then polymerized under the presence of polymer particles that are swellable by at least one of the above monomers.

Production method (II) is thus practically the same as production method (I) besides the use of a radical polymerization initiator that has a cationic group and slight differences in the usage amounts of the monomers (a), (b), and (c), and the polymerization method, operation, conditions, and the like, including the method of preparing the swellable polymer particles, which have been described for production method (I), apply here as well.

With production method (II), the polymerizing monomer may consist of just the crosslinking monomer (a), or the cationic monomer (b) and/or the copolymerizable, non-crosslinking, nonionic monomer (c) may be used in combination.

The unfavorable phenomena that occur (a) when the usage amount of the crosslinking monomer is excessively low and less than 1 weight %, (b) when the usage amount of the cationic monomer is excessively high and greater than 15 weight %, and (c) when the usage amount of the copolymerizable, non-crosslinking, non-ionic monomer is excessively high and greater than 99 weight % are the same as those described for production method (I).

The usage amount of the radical polymerization initiator with cationic group is preferably 0.1 to 10 weight parts and more preferably 0.5 to 5 weight parts per 100 weight parts of the total amount of the monomers used in the polymerization. If this usage amount is less than 0.1 weight parts and excessively low, the cationic property of the hollow crosslinked particles will be low, and an excessively high usage amount of greater than 10 weight parts is unfavorable as the polymerization will then be unstable.

A characteristic of such a production method (II) is that hollow crosslinked particles with only a few aggregates can be obtained.

<Production Method (III)>

Production method (III) is a method of obtaining the cationic hollow crosslinked polymer particles of the present invention by making the swellable polymer particles of production method (I) be cationic.

The swellable polymer particles are obtained by polymerizing (a) 0.01 to 15 weight % and preferably 1 to 10 weight % of a cationic monomer and (d) 85 to 99.99 weight % and preferably 90 to 99 weight % of a nonionic monomer that is copolymerizable with the abovementioned cationic monomer (the total amount of the monomers being 100 weight %). The swellable polymer particles that are thus obtained can be swelled by any of the below-described monomers (a), (b), and (c), used in the polymerization.

Under the presence of the above-described cationic swellable polymer particles, (a) 1 to 100 weight % and preferably 10 to 50 weight % of a crosslinking monomer, (b) 0 to 15 weight % and preferably 0 to 5 weight % of a cationic monomer, and (c) 0 to 99 weight % and preferably 45 to 90 weight % of a copolymerizable monomer that is non-crosslinking and nonionic (the total amount of the monomers being 100 weight %) are polymerized to obtain the hollow crosslinked particles.

Production method (III) is thus practically the same as production method (I) besides the use of swellable polymer particles that are as described above and, as with production method (II), the slight differences in the usage amounts of the monomers (a), (b), and (c), and the polymerization method, operation, conditions, and the like, which have been described for production method (I), apply here as well.

In preparing the above-described cationic swellable polymer particles by polymerization, the swellable polymer particle preparation method described for production method (I) can be applied.

When the usage amount of the monomer (a), used for preparing the cationic swellable polymer particles, is less than 0.01 weight % and excessively low (when the usage amount of the monomer (d) is greater than 99.99 weight % and excessively high), the cationic property of the present invention's cationic hollow crosslinked polymer particles will be low. On the other hand, an excessively high usage amount of monomer (a) that is greater than 15 weight % (an excessively low usage amount of monomer (b) that is less than 85 weight %) is unfavorable as the polymerization will then be unstable.

As with production method (II), the polymerizing monomer may consist of just the crosslinking monomer (a), or the cationic monomer (b) and/or the copolymerizable, non-crosslinking, nonionic monomer (c) may be used in combination in production method (III).

The unfavorable phenomena that occur (a) when the usage amount of the crosslinking monomer is excessively low and less than 1 weight %, (b) when the usage amount of the cationic monomer is excessively high and greater than 15 weight %, and (c) when the usage amount of the copolymerizable, non-crosslinking, non-ionic monomer is excessively high and greater than 99 weight % are the same as those described for production method (I).

Such a production method (III) is used favorably in the case of producing hollow crosslinked particles with which the amount of cationic groups and the fewness of aggregates are balanced.

<Production Method (IV)>

As with production method (III), production method (IV) is a method of obtaining the cationic hollow crosslinked polymer particles of the present invention by making the swellable polymer particles of production method (I) be cationic.

The swellable polymer particles are obtained by polymerizing (a) 0 to 15 weight % of a cationic monomer and (d) 85 to 100 weight % of a nonionic monomer that is copolymerizable with the abovementioned cationic monomer (the total amount of the monomers being 100 weight %) using a radical polymerization initiator with a cationic group.

These swellable polymer particles are swellable by at least one of the monomers (a), (b), and (c) used in the polymerization.

As with production method (III), the hollow crosslinked particles are then obtained by polymerizing (a) 1 to 100 weight % and preferably 10 to 50 weight % of a crosslinking monomer, (b) 0 to 15 weight % and preferably 0 to 10 weight % of a cationic monomer, and (c) 0 to 99 weight % and preferably 45 to 90 weight % of a copolymerizable monomer that is non-crosslinking and nonionic (the total amount of the monomers being 100 weight %) under the presence of the above-described cationic swellable polymer particles.

Production method (IV) is thus practically the same as production method (III) besides the use of a radical polymerization initiator with cationic group in the preparation of the cationic swellable polymer particles and the slight differences in the usage amounts of the monomers (a), and (b). The method, operation, conditions, and the like, of the polymerization of monomers (a), (b), (c), which have been described for production method (I), apply here as well.

The usage amount of the radical polymerization initiator with cationic group used in the preparation of the swellable polymer particles is preferably 0.1 to 10 weight parts and more preferably 0.5 to 5 weight parts per 100 weight parts of the total amount of monomers (a) and (d). If the usage amount is excessively low and less than 0.1 weight parts, the cationic property of the hollow crosslinked particles that are obtained will be low, and an excessive usage amount greater than 10 weight parts is unfavorable since the polymerization will then be unstable.

As with production method (III), the polymerization method for producing hollow crosslinked particles that was described for production method (I), can be applied in preparing the above-described cationic swellable polymer particles by polymerization. Needless to say, a seed polymer does not need to be used in carrying out the preparation.

It is unfavorable for the usage amount of the monomer (a), used in preparing the cationic swellable polymer particles, to be excessive and be greater than 15 weight % (and especially greater than 30 weight %) (i.e. for the usage amount of monomer (d) to be excessively low and less 85 weight % (and especially less than 70 weight %)), since the polymerization will then be unstable.

As with production method (III), the polymerizing monomer may consist of just the crosslinking monomer (a), or the cationic monomer (b) and/or the copolymerizable, non-crosslinking, nonionic monomer (c) may be used in combination in production method (IV).

The unfavorable phenomena that occur (a) when the usage amount of the crosslinking monomer is excessively low and less than 1 weight %, (b) when the usage amount of the cationic monomer is excessively high and greater than 15 weight %, and (c) when the usage amount of the copolymerizable, non-crosslinking, non-ionic monomer is excessively high and greater than 99 weight % are the same as those described for production method (I).

The use of a radical polymerization initiator with cationic group as the polymerization initiator in the process of polymerization is favorable for adjusting the zeta potential to be within the range of the present invention and also in terms of polymerization stability. In this case, the usage amount of the radical polymerization initiator with a cationic group is as described above.

A characteristic of such a production method (IV) is that hollow crosslinked particles with extremely few aggregates can be produced.

(iii) Production Methods (V) to (VIII)

The production methods (V) to (VIII) for producing the cationic hollow crosslinked polymer particles of the present invention shall now be described.

<Production Method (V)>

With this production method (V), (a) 5 to 90 weight %, preferably 10 to 80 weight %, and more preferably 15 to 70 weight % of a crosslinking monomer, (b) 0.01 to 15 weight %, preferably 0.1 to 10 weight %, and more preferably, 0.5 to 5 weight % of a cationic monomer, and (c) 9.99 to 94.99 weight %, preferably 10 to 90 weight %, and more preferably 25 to 84.5 weight % of a copolymerizable monomer that is non-crosslinking and non-ionic (the total amount of the monomers being 100 weight %)

are polymerized under the presence of polymer particles that are swellable by at least one of the above monomers (shall also be referred to hereinafter simply as "swellable polymer particles") and preferably in an aqueous medium.

As with the formerly described methods, though the mechanism by which the hollow crosslinked particles are formed in the above-described method is not necessarily clear, a void is likewise formed in the interior of the crosslinked polymer so that a hollow body is formed by the crosslinked polymer. Meanwhile, voids are not formed if the swellable polymer is not present.

This assumption is considered to apply not only to production method (V) but also to the other production methods (VI) to (VIII).

With this method, if the usage amount of the crosslinking monomer (a) is less than 5 weight % and excessively low, the strength of the particles during polymerization will be inadequate, causing each particle to shrink as a whole, and due to inadequate distortion by polymerization shrinkage of the particle interiors, inner voids are prevented from being formed or the strength is made small even if polymer particles with inner voids are formed. If the usage amount of the crosslinking monomer (a) exceeds 99.99 weight % and is excessively high, the usage amount of the cationic monomer (b) will be small, and the hollow crosslinked particles that are obtained will be low in cationic property.

The usage amount of the crosslinking monomer (a) is calculated as the amount of pure product obtained by subtracting the amounts of inert solvents and monofunctional, non-crosslinking monomer components that are contained in the crosslinking monomer material that is normally sold.

If the usage amount of the cationic monomer (b) is less than 0.01 weight % and excessively low, the cationic property of the hollow crosslinked particles obtained will be low and the abovementioned condition concerning the zeta potential will not be satisfied. On the other hand, an excessively high usage amount of the cationic monomer in the excess of 15 weight % is unfavorable as aggregates will be produced during polymerization.

The non-crosslinking, nonionic, copolymerizable monomer (c) is a monomer that is arbitrarily used as suited to change the hydrophilicity or to improve the heat resistance. If the usage amount of this monomer exceeds 94.99% and is excessively high, the usage amounts of the crosslinking monomer (a) and the cationic monomer (b) will become low and the strength and cationic property of the polymer particles obtained will be low.

The descriptions that have been given above are applicable with regard to the meaning of "swellable by monomer," the swellable polymer particles and the preparation method thereof, the polymerization under the presence of these swellable polymer particles, and the like.

After polymerization, the present invention's cationic hollow crosslinked polymer particles with voids in the interior can be obtained by separating the hollow crosslinked particles from the aqueous dispersion and then drying.

With the production method (V) of the present invention, cationic hollow crosslinked polymer particles that are hollow bodies, each having a single void and having, for example, an average outer diameter (average particle diameter) of 0.03 to 10 μm and an inner diameter of 0.2 to 0.95 times the outer diameter, can be obtained. This is the same for production methods (VI) to (VIII) as well.

Such a production method (V) can be used favorably for producing hollow crosslinked particles with an especially large number of cationic groups.

<Production Method (VI)>

With production method (VI), polymerization is carried out using a radical polymerization initiator with cationic group to add a cationic property to the hollow crosslinked particles that are obtained.

(a) 5 to 90 weight %, preferably 10 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 10 to 95 weight %, preferably 10 to 90 weight, and more preferably 20 to 84.9 weight % of a copolymerizable monomer that is non-crosslinking and nonionic (the total amount of the monomers being 100 weight %)

are then polymerized under the presence of polymer particles that are swellable by at least one of the above monomers.

Production method (VI) is thus practically the same as production method (I) besides the use of a radical polymerization initiator that has a cationic group and slight differences in the usage amounts of the monomers (a), (b), and (c), and the polymerization method, operation, conditions, and the like, including the method of preparing the swellable polymer particles, which have been described for production method (V), apply here as well.

With production method (VI), the polymerizing monomer may consist of just the crosslinking monomer (a), or the cationic monomer (b) and/or the copolymerizable, non-crosslinking, nonionic monomer (c) may be used in combination.

The unfavorable phenomena that occur (a) when the usage amount of the crosslinking monomer is excessively low and less than 5 weight %, (b) when the usage amount of the cationic monomer is excessively high and greater than 15 weight %, and (c) when the usage amount of the copolymerizable, non-crosslinking, non-ionic monomer is excessively high and greater than 95 weight % are the same as those described for production method (V).

The usage amount of the radical polymerization initiator with cationic group is preferably 0.1 to 10 weight parts and more preferably 0.5 to 5 weight parts per 100 weight parts of the total amount of the monomers used in the polymerization. If this usage amount is less than 0.1 weight parts and excessively low, the cationic property of the hollow crosslinked particles will be low, and an excessively high usage amount of greater than 10 weight parts is unfavorable as the polymerization will then be unstable.

A characteristic of such a production method (VI) is that hollow crosslinked particles with only a few aggregates can be obtained.

<Production Method (VII)>

Production method (VII) is a method of obtaining the cationic hollow crosslinked polymer particles of the present invention by making the swellable polymer particles of production method (V) be cationic.

The swellable polymer particles are obtained by polymerizing (b) 0.01 to 30 weight %, preferably 0.1 to 15 weight %, and more preferably 1 to 10 weight % of a cationic monomer and (d) 70 to 99.99 weight %, preferably 85 to 99.9 weight %, and more preferably 90 to 99 weight % of a nonionic monomer that is copolymerizable with the abovementioned cationic monomer (the total amount of the monomers being 100 weight %). The swellable polymer particles that are thus obtained can be swelled by any of the below-described monomers (a), (b), and (c), used in the polymerization.

Under the presence of the above-described cationic swellable polymer particles, (a) 5 to 90 weight %, preferably 10 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 10 to 95 weight %, preferably 10 to 90 weight %, and more preferably 20 to 84.9 weight % of a copolymerizable monomer that is non-crosslinking and nonionic (the total amount of the monomers being 100 weight %)

are polymerized to obtain the hollow crosslinked particles.

Production method (VII) is thus practically the same as production method (V) besides the use of swellable polymer particles that are as described above and, as with production method (VI), the slight differences in the usage amounts of the monomers (a), (b), and (c), and the polymerization method, operation, conditions, and the like, which have been described for production method (V), apply here as well.

In preparing the above-described cationic swellable polymer particles by polymerization, the swellable polymer particle preparation method described for production method (V) can be applied.

When the usage amount of the monomer (b), used for preparing the cationic swellable polymer particles, is less than 0.01 weight % and excessively low (when the usage amount of the monomer (d) is greater than 99.99 weight % and excessively high), the cationic property of the present invention's cationic hollow crosslinked polymer particles will be low. On the other hand, an excessively high usage amount of monomer (b) that is greater than 30 weight % (an excessively low usage amount of monomer (b) that is less than 70 weight %) is unfavorable as the polymerization will then be unstable.

As with production method (VI), the polymerizing monomer may consist of just the crosslinking monomer (a), or the cationic monomer (b) and/or the copolymerizable, non-crosslinking, nonionic monomer (c) may be used in combination in production method (VII).

The unfavorable phenomena that occur (a) when the usage amount of the crosslinking monomer is excessively low and less than 5 weight %, (b) when the usage amount of the cationic monomer is excessively high and greater than 15 weight %, and (c) when the usage amount of the copolymerizable, non-crosslinking, non-ionic monomer is excessively high and greater than 95 weight % are the same as those described for production method (V).

Such a production method (VII) is used favorably in the case of producing hollow crosslinked particles with which the amount of cationic groups and the fewness of aggregates are balanced.

<Production Method (VIII)>

Production method (VIII) is (i) a method for obtaining cationic hollow crosslinked polymer particles by making the swellable polymer particles be cationic by using a radical polymerization initiator with cationic group in preparing the swellable polymer particles by polymerization, (ii) a method for obtaining cationic hollow crosslinked polymer particles by using a radical polymerization initiator to polymerize the monomers (a), (b), and (c) as in production method (VI), or (iii) a method for obtaining cationic hollow crosslinked polymer particles by combining the methods of (i) and (ii) described above.

Of the above, the method of (iii) is preferable.

The swellable polymer particles are obtained by polymerizing (b) 0 to 30 weight %, preferably 0 to 15 weight %, and more preferably 0.1 to 10 weight % of a cationic monomer and (d) 70 to 100 weight %, preferably 85 to 100 weight %, and more preferably 90 to 99.9 weight % of a nonionic monomer that is copolymerizable with the abovementioned cationic monomer (the total amount of the monomers being 100 weight %).

With the above-described methods of (i) and (iii), a radical initiator with cationic group is used as the radical polymerization initiator, and the swellable polymer particles that are prepared are cationic.

The swellable polymer particles that are thus obtained can be swelled by any of the below-described monomers (a), (b), and (c), used in the polymerization.

And as with production method (VII), (a) 5 to 90 weight %, preferably 10 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 10 to 95 weight %, preferably 10 to 90 weight %, and more preferably 20 to 84.9 weight % of a copolymerizable monomer that is non-crosslinking and nonionic (the total amount of the monomers being 100 weight %)

are polymerized under the presence of the above-described cationic swellable polymer particles and using the radical initiator to obtain the hollow crosslinked particles.

With the above-described methods of (ii) and (iii), a radical initiator with cationic group is used as the radical polymerization initiator.

Production method (VIII) is thus practically the same as production method (VII) besides the points that a radical polymerization initiator with cationic group is used in some cases to prepare the swellable polymer particles, a radical polymerization initiator with cationic group is used in some cases in polymerizing the monomers (a), (b), and (c), and being slightly different in the usage amounts of the monomers (b) and (d) for obtaining the swellable polymer particles, and the method, operation, conditions, and the like, for polymerizing the monomers (a), (b), and (c), which have been described for production method (V), apply here as well.

In cases where a radical polymerization initiator with cationic group is to be used in the preparation of the swellable polymer particles, the usage amount thereof is preferably 0.1 to 10 weight parts and more preferably 0.5 to 5 weight parts per 100 weight parts of the total amount of monomers (b) and (d). If the usage amount is excessively low and less than 0.1 weight parts, the cationic property of the hollow crosslinked particles that are obtained will be low and an excessive usage amount greater than 10 weight parts is unfavorable as this will cause the polymerization to be unstable.

In cases where a radical polymerization initiator with cationic group is to be used in the polymerization of monomers (a), (b), and (c), the usage amount is preferably 0.1 to 10 weight parts and more preferably 0.5 to 5 weight parts per 100 weight parts of the total amount of monomers.

As with production method (VII), the polymerization method for preparing the hollow crosslinked particles described for production method (V) may be applied as the polymerization method for preparing the above-described swellable polymer particles by polymerization. A seed polymer may also be used in the preparation.

An excessively high usage amount of monomer (b) that is greater than 30 weight % (an excessively low usage amount of monomer (d) that is less than 70 weight %) is unfavorable as the polymerization will then be unstable.

As with production method (VII), the polymerizing monomer may consist of just the crosslinking monomer (a), or the cationic monomer (b) and/or the copolymerizable, non-crosslinking, nonionic monomer (c) may be used in combination in production method (VIII).

The unfavorable phenomena that occur (a) when the usage amount of the crosslinking monomer is excessively low and less than 5 weight %, (b) when the usage amount of the cationic monomer is excessively high and greater than 15 weight %, and (c) when the usage amount of the copolymerizable, non-crosslinking, non-ionic monomer is excessively high and greater than 95 weight % are the same as those described for production method (I).

The use of a radical polymerization initiator with cationic group as the polymerization initiator in the process of polymerization is favorable for adjusting the zeta potential to be within the range of the present invention and also in terms of polymerization stability. In this case, the usage amount of the radical polymerization initiator with cationic group is as has been described above.

A characteristic of such a production method (VII) is that hollow crosslinked particles with extremely few aggregates can be produced.

(2) Paint Composition

A first paint composition of a first aspect of the present invention and a second paint composition of a second aspect of the present invention shall now be described in detail. The first and second compositions shall also simply be referred to collectively as "paint compositions."

The components that comprise the paint compositions shall be described first.

[Cationic Hollow Crosslinked Polymer Particles]

The cationic hollow crosslinked polymer particles (shall also be referred to hereinafter as "hollow crosslinked particles") are such that the zeta potential as measured in an aqueous medium of pH 2 to 9 is in the range of +5 to +100 mV and preferably +10 to +60 mV.

With a preferred embodiment of the first paint composition, the hollow crosslinked particles are such that the volume hollowness is in the range of 1 to 80% and preferably 3 to 40%, and the average particle diameter is in the range of 0.03 to 10 μm and preferably 0.1 to 5 μm. With the second paint composition, the hollow crosslinked particles are such that the volume hollowness is in the range of 1 to 80% and preferably 3 to 40%, and the average particle diameter is in the range of 0.03 to 10 μm and preferably 0.1 to 5 μm.

The zeta potential is an indicator that expresses the ionicity of the particles, and that the zeta potential of the hollow crosslinked particles of the present invention lies in the abovementioned range indicates that the hollow crosslinked particles are cationic in a wide range of acidic to basic environments. That is, the hollow crosslinked particles will not aggregate with the film-forming cationic polymer, which is the binder component, and the paint composition will thus be excellent in preservation stability in a wide range of acidic to basic surroundings.

The zeta potential of the hollow crosslinked particles is measured by the following method.

This zeta potential measurement method is as has been described above.

The volume hollowness is the volumetric proportion taken up by the void in each particle. If the volume hollowness is less than 1%, the particles will practically not function as hollow crosslinked particles. A volume hollowness in the excess of 80% is not favorable since the strength will be lowered.

With the present invention, the volume hollowness is measured by the method that has been described above.

As has been mentioned above, the hollow crosslinked particles have an average particle diameter preferably in the range of 0.03 to 10 μm and are microparticulate. When the particle diameter is in this range, favorable results can be obtained in terms of dispersion in a paint solvent, coat strength, and stability of the paint. Hollow crosslinked particles of an average particle diameter of less than 0.03 μm are difficult to obtain in terms of production, and an average particle diameter in the excess of 10 μm is unfavorable as the paint will then be unstable.

With the present invention, the average particle diameter is measured by the method that has been described above.

Since the above-described cationic hollow crosslinked polymer particles that are contained in the paint compositions of the present invention maintain a cationic property in a wide range of acidic to basic surroundings and have adequate strength and dispersion properties, they are excellent as white pigments for paints.

It is furthermore preferable for the hollow crosslinked particles to have the following characteristics.

First, the hollow crosslinked particles preferably has solvent resistance against organic solvents, such as toluene, alcohol, and the like. By having solvent resistance, an advantage is provided in that the shapes of the particles will be maintained when the particles are blended in the paint. To be more specific, the parts dissolved in toluene at 25° C. is preferably 10% or less.

Furthermore, the hollow crosslinked particles preferably has heat resistance. By having heat resistance, an advantage is provided in that the shapes of the particles will be maintained even in a high-temperature drying process. To be more specific, the 10% mass reduction temperature as measured by a heat balance (TGA) is preferably 240° C. or more.

Such solvent resistance and heat resistance can be expressed by suitable selection of the monomer species.

As the polymers that comprise the cationic hollow crosslinked polymer particles, those indicated above may be applied.

The hollow crosslinked particles are preferably comprised of structural units that are derived from a crosslinking monomer and structural units that are derived from another monomer that is copolymerizable with the abovementioned crosslinking monomer. The proportion of the structural units derived from a crosslinking monomer is preferably 5 to 90 weight %, more preferably 10 to 60 weight %, and even more preferably 15 to 50 weight %, and the proportion of the structural units derived from the other monomer is preferably 95 to 10 weight %, more preferably 90 to 40 weight %, and even more preferably 85 to 50% (here, the total amount of the two types of structural units is 100 weight %).

That structures derived from a crosslinking monomer exists in the abovementioned range in the hollow crosslinked particles signify that the hollow crosslinked particles possess many crosslinked structures and thus that the hollow crosslinked particles will have good strength and heat resistance and bring about favorable results.

Here, the proportions of the structural units derived from the crosslinking monomer and the proportions of the structural units derived from the other monomer are average values of the total polymer that comprise the hollow crosslinked particles. For example, in the below-mentioned production methods (I) to (IV), which are favorable methods for obtaining the hollow crosslinked particles, the above proportions are calculated as the average values for the polymer of the swellable polymer particles and the polymer resulting from the polymerization carried out under the presence of the abovementioned swellable polymer particles.

Though not restricted in particular, the above-described production methods (I) to (IV) are favorable as methods of producing the above-described first cationic hollow crosslinked polymer particles contained in the first paint composition and the second cationic hollow crosslinked polymer particles contained in the second paint composition of the present invention, and the indications given above apply as well.

With the production method (I) of the cationic hollow crosslinked polymer particles in the first composition, (a) 1 to 99.99 weight %, preferably 5 to 80 weight %, and more preferably 15 to 70 weight % of a crosslinking monomer, (b) 0.01 to 15 weight %, preferably 0.1 to 10 weight %, and more preferably 0.5 to 5 weight % of a cationic monomer, and (c) 0 to 98.99 weight %, preferably 10 to 94.99 weight %, and more preferably 25 to 84.5 weight % of a copolymerizable monomer that is non-crosslinking and nonionic (the total amount of the monomers being 100 weight %) can be used.

With production method (II), (a) 1 to 100 weight %, preferably 5 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 0 to 99 weight %, preferably 10 to 95 weight %, and more preferably 20 to 84.9 weight % of a copolymerizable monomer that is non-crosslinking and nonionic (the total amount of the monomers being 100 weight %) can be used.

With production method (III), (b) 0.01 to 30 weight %, preferably 0.1 to 15 weight %, and more preferably 1 to 10 weight % of a cationic monomer, and (c) 70 to 99.99 weight %, preferably 85 to 99.9 weight %, and more preferably 90 to 99 weight % of a nonionic monomer that is copolymerizable with the abovementioned cationic monomer (the total amount of the monomers being 100 weight %) can be used.

The swellable polymer particles are swellable by any of the below-described monomers (a), (b), and (c) that are used in the polymerization.

The hollow crosslinked particles are obtained by polymerizing (a) 1 to 100 weight %, preferably 5 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 0 to 95 weight %, preferably 10 to 90 weight %, and more preferably 20 to 84.9 weight % of a copolymerizable monomer that is non-crosslinking and non-ionic (the total amount of the monomers being 100 weight %) under the presence of the above-described cationic swellable polymer particles.

Furthermore production method (IV) is
(i) a method for obtaining cationic hollow crosslinked polymer particles by making the swellable polymer particles cationic by using a radical polymerization initiator with cationic group in preparing the swellable polymer particles of production method (I) by polymerization,
(ii) a method for obtaining cationic hollow crosslinked polymer particles by using a radical polymerization initiator to polymerize the monomers (a), (b), and (c) as in production method (II), or
(iii) a method for obtaining cationic hollow crosslinked polymer particles by combining the methods of (i) and (ii) described above. Of the above, the method of (iii) is preferable.

The swellable polymer particles are obtained by polymerizing
(b) 0 to 30 weight %, preferably 0 to 15 weight %, and more preferably 0.1 to 10 weight % of a cationic monomer and
(d) 70 to 100 weight %, preferably 85 to 100 weight %, and more preferably 90 to 99.9 weight % of a nonionic monomer that is copolymerizable with the abovementioned cationic monomer (the total amount of the monomers being 100 weight %). With the above-described methods of (i) and (iii), a radical initiator with cationic group is used as the radical polymerization initiator, and the swellable polymer particles that are prepared are cationic.

The swellable polymer particles that are thus obtained can be swelled by at least one of the monomers (a), (b), and (c), used in the polymerization.

And, as with production method (III),
(a) 1 to 100 weight %, preferably 5 to 80 weight %, and more preferably 15 to 70 weight % of a crosslinking monomer, (b) 0 to 15 weight %, preferably 0 to 10 weight %, and more preferably 0.1 to 10 weight % of a cationic monomer, and (c) 0 to 99 weight %, preferably 10 to 95 weight %, and more preferably 20 to 84.9 weight % of a copolymerizable monomer that is non-crosslinking and nonionic (the total amount of the monomers being 100 weight %) are polymerized under the presence of the above-described cationic swellable polymer particles and using the radical initiator to obtain the hollow crosslinked particles. With the above-described methods of (ii) and (iii), a radical initiator with cationic group is used as the radical polymerization initiator.

Production method (IV) is thus practically the same as production method (III) besides the points that a radical polymerization initiator with cationic group is used in some cases to prepare the swellable polymer particles, a radical polymerization initiator with cationic group is used in some cases in polymerizing the monomers (a), (b), and (c), and being slightly different in the usage amounts of the monomers (b) and (d) for obtaining the swellable polymer particles, and the method, operation, conditions, and the like, for polymerizing the monomers (a), (b), and (c), which have been described for production method (I), apply here as well.

A characteristic of such a production method (IV) is that hollow crosslinked particles with extremely few aggregates can be produced.

The above-described cationic hollow crosslinked polymer particles are blended in the paint composition (the solids from which solvent has been removed) of the present invention at an amount of preferably 0.1 to 80 weight % and more preferably 1 to 60 weight %. If the amount is less than 0.1 weight %, the hiding property will be inadequate and if the amount exceeds 80 weight %, the coat performance will be poor.

[Film-Forming Cationic Polymer]

The film-forming cationic polymer (shall also be referred to hereinafter simply as "cationic polymer") that is contained in the paint composition of the present invention is not restricted in particular as long as it has cationic groups and can form a film upon application, drying, and, where necessary, heating of the coating solution of the paint composition. Here, the cationic groups are the same in definition as the cationic groups of the hollow crosslinked particles, and the same specific examples as those given for the cationic groups of the hollow crosslinked particles can be given here as well.

Preferable cationic polymers include
(i) polymers, which are obtained by copolymerization of the above-described cationic monomer (b), used for producing the above-described hollow crosslinked particles, and a monomer of (I) to (VI), described below, and (ii) a polymer, which is obtained by copolymerization of the monomers of (I) to (VI), described below, and, where suited, the abovementioned cationic monomer (b) using the above-described radical polymerization initiator with cationic group that is used for producing the hollow crosslinked particles.

(Monomers)

(I) Alkyl Esters of Acrylic Acid or Methacrylic Acid

Methyl acrylate, methyl methacrylate, ethyl acrylate, ethyl methacrylate, butyl acrylate, butyl methacrylate, cyclohexyl methacrylate, 2-ethylhexyl acrylate, 2-hydroxyethyl methacrylate, and the like.

(II) Aromatic Vinyl Compounds

Styrene, α-methylstyrene, vinyltoluene, t-butylstyrene, and the like.

(III) Olefins

Ethylene, propylene, 1-butene, 1-hexene, 4-methyl-1-pentene, 1-octene, and the like.

(IV) Vinyl Esters

Vinyl acetate, vinyl propionate, and the like.

(V) Nitrile Compounds

Acrylonitrile, methacrylonitrile, and the like.

(VI) Polymerizing Amides

Acrylamide, methacrylamide, diacetone amide, N-methylol acrylamide, and the like.

Of the above, a cationic polymer, with which a component of alkyl ester of acrylic acid or methacrylic acid comprises 30 weight % or more and especially 50 weight % or more of the total structural units, is preferable in terms of the weatherability of the coat.

The amount of cationic groups contained in the polymer is preferably 0.05 to 100 mmol/100 g of polymer and especially preferably 0.2 to 50 mmol/100 g of polymer.

An acidic-group-containing monomer, such as acrylic acid, methacrylic acid, itaconic acid, maleic acid, fumaric acid, crotonic acid, and the like, may be copolymerized in the cationic polymer in minute amounts within a range that will not lower the cationic property of the cationic polymer.

The cationic polymer is preferably prepared in a microdispersed state in an aqueous medium. Though the cationic polymer may be prepared in a microdispersed state in an aqueous medium by polymerizing the abovementioned monomers in an aqueous medium using an emulsion polymerization method or a suspension polymerization method, the method of preparation is not limited to these methods.

The method, procedures, conditions, and the like, which have been described for polymerizing the monomers (a), (b), and (c) by the hollow crosslinked particle production method (I) or production method (II), can be applied substantially as the method, procedures, conditions, and the like, to be employed in carrying out the emulsion polymerization or suspension polymerization for producing the above-described cationic polymer.

The above-described film-forming cationic polymer is blended in the paint composition (the solids from which solvent has been removed) of the present invention at an amount of preferably 5 to 99.9 weight %, more preferably 10 to 99 weight %, and especially preferably 20 to 90 weight %. If the amount is less than 5 weight %, the coat performance will be inadequate, and if the amount exceeds 99.9 weight %, the hiding property will be poor.

[Solvent]

The paint composition of the present invention is preferably prepared as an aqueous dispersion dispersed in an aqueous solvent. The solids concentration of the aqueous dispersion is preferably 5 to 70 weight % and more preferably 10 to 60 weight %.

[Other Arbitrary Components]

The paint composition of the present invention may contain, according to purpose, additives such as a light stabilizer, ultraviolet light absorber, organic solvent, crosslinking agent, water-soluble polymer (for example, water-soluble polyester resin, water-soluble epoxy resin, water-soluble acrylic resin, polyvinyl alcohol, starch), anti-foaming agent, thickening agent, heat stabilizer, leveling agent, lubricant, anti-static agent, colorant, delustering agent, pigment, mildew-proofing agent, and the like.

Such additives may be added to the paint composition of the present invention in a range that will not disable the attainment of the objects of the present invention.

[Preparation and Coating of the Paint Composition]

The paint composition of the present invention is prepared by mixing the respective components, and there are no particular restrictions concerning the preparation method to be used. That is, normally-used mixers and reaction containers, such as stirring tank, autoclave, flasks, reactors, and the like, may be used.

The paint composition that has been prepared is coated onto the surface of the object to be coated. The coating is normally performed so that the thickness of the coat that is formed will be in the range of 10 to 100 μm.

Various known coating methods, for example, brush coating, hopper coating, bar coater coating, rotation coating, spray coating, curtain coating, dip coating, air knife coating, blade coating, roll coating, and the like, can be used as the coating method for the paint composition.

By then drying at room temperature to 200° C., a coat is formed on the surface of the coated object.

The paint composition of the present invention can form a lightweight film that is high in hiding property, and the binder component and the hollow crosslinked particles that comprise the formed film are cationic.

The paint composition of the present invention can thus be used as the topcoat paint or the prime coat paint of an acrylic paint or other paint, which has an anionic polymer as the binder component and is generally used as the interior or exterior paint of a building, and forms a coat that is excellent in adhesion.

The paint composition of the present invention can also be used as a coating material for metals, paper, wood materials, concrete, plastics, ceramics, slate, and plaster.

(3) Cationic Electrodeposition Paint Composition

The cationic electrodeposition paint composition of the present invention shall now be described in detail. First, the components that comprise the cationic electrodeposition paint composition shall be described.

[Cationic Hollow Crosslinked Polymer Particles]

The cationic hollow crosslinked polymer particles (shall also be referred to hereinafter as "hollow crosslinked particles") are such that the zeta potential as measured in an aqueous medium of pH 2 to 9 is in the range of +5 to +100 mV and preferably +10 to +60 mV.

With a preferred embodiment, the hollow crosslinked particles are such that the volume hollowness is in the range of 1 to 80% and preferably 3 to 40%, and the average particle diameter is in the range of 0.03 to 10 μm and preferably 0.1 to 5 μm.

The zeta potential is an indicator that expresses the ionicity of the particles, and that the zeta potential of the hollow crosslinked particles of the present invention lies in the abovementioned range indicates that the hollow crosslinked particles are cationic in a wide range of acidic to basic environments. That is, the particles will be cationic as a whole, will not aggregate with the film-forming cationic polymer, which is the binder component, and the cationic electrodeposition paint composition will thus be excellent in preservation stability and form a uniform electrodeposition coat in a wide range of acidic to basic surroundings.

The zeta potential of the hollow crosslinked particles is measured by the method that has been described above.

The volume hollowness is the volumetric proportion taken up by the void in each particle. If the volume hollowness is less than 1%, the particles will practically not function as hollow crosslinked particles. A volume hollowness in the excess of 80% is not favorable since the strength will be lowered. By blending hollow crosslinked particles, with a volume hollowness in the abovementioned range, in the cationic electrodeposition paint composition, a lightweight electrodeposited film can be formed practically without lowering the strength.

With the present invention, the volume hollowness is measured by the method that has been described above.

As has been mentioned above, the hollow crosslinked particles have an average particle diameter preferably in the range of 0.03 to 10 $\mu$m and are microparticulate. When the particle diameter is in this range, the particles will be well-dispersed in the cationic electrodeposition paint composition and favorable results can be obtained in terms of the stability of the cationic electrodeposition paint composition. Hollow crosslinked particles of an average particle diameter of less than 0.03 $\mu$m are difficult to obtain in terms of production and an average particle diameter in the excess of 10 $\mu$m is unfavorable as the cationic electrodeposition paint composition will then be unstable.

With the present invention, the average particle diameter is measured by the method that has been described above.

Since the above-described cationic hollow crosslinked polymer particles that are contained in the cationic electrodeposition paint composition of the present invention maintain a cationic property in a wide range of acidic to basic surroundings and have adequate strength and dispersion properties, they are excellent as the white pigment for the electrodeposition paint.

It is furthermore preferable for the hollow crosslinked particles to have the following characteristics.

First, the hollow crosslinked particles preferably has solvent resistance against organic solvents, such as toluene, alcohol, and the like. By having solvent resistance, an advantage is provided in that the shapes of the particles will be maintained when the particles are blended in the cationic electrodeposition paint. To be more specific, the parts dissolved in toluene at 25° C. is preferably 10% or less.

Furthermore, the hollow crosslinked particles preferably has heat resistance. By having heat resistance, an advantage is provided in that the shapes of the particles will be maintained in a high-temperature stoving process. To be more specific, the 10% mass reduction temperature as measured by a heat balance (TGA) is preferably 240° C. or more.

Such solvent resistance and heat resistance can be expressed by suitable selection of the monomer species.

Examples of the polymers that comprise the cationic hollow crosslinked polymer particles include thermoplastic resins and thermosetting resins, such as acrylic resins, polystyrene resins, polyolefin resins, polyester resins, polycarbonate resins, polyurethane resins, phenol resins, epoxy resins, ionomer resins, vinyl chloride resins, fluororesins, butadiene resins, and the like. It is essential for at least part of the abovementioned polymers that comprise the hollow crosslinked particles to have a cationic group.

With the present invention, cationic groups include amino groups and other groups that can bind with a proton to form a cation and groups that form the cationic part of salts resulting from reactions of the abovementioned groups with an acid.

Specific examples of cationic groups include primary amino groups, secondary amino groups, tertiary amino groups; quaternary amino groups, secondary imino groups, tertiary imino groups, quaternary imino groups; amidino groups, imidino groups, and hydrazino groups of various valences; the pyridyl group and other annular groups that contain a nitrogen atom, and the like.

The concentration of the cationic groups in the hollow crosslinked particles of the present invention is preferably 0.05 to 300 mmol per 100 g of particles and more preferably 1 to 100 mmol per 100 g of particles.

The hollow crosslinked particles are preferably comprised of structural units that are derived from a crosslinking monomer and structural units that are derived from another monomer that is copolymerizable with the abovementioned crosslinking monomer. The proportion of the structural units derived from a crosslinking monomer is preferably 5 to 90 weight %, more preferably 10 to 60 weight %, and even more preferably 15 to 50 weight %, and the proportion of the structural units derived from the other monomer is preferably 95 to 10 weight %, more preferably 90 to 40 weight %, and even more preferably 85 to 50% (here, the total amount of the two types of structural units is 100 weight %).

That structures derived from a crosslinking monomer exists in the abovementioned range in the hollow crosslinked particles signify that the hollow crosslinked particles possess many crosslinked structures and thus that the hollow crosslinked particles will have good strength and heat resistance and bring about favorable results.

Here, the proportions of the structural units derived from the crosslinking monomer and the proportions of the structural units derived from the other monomer are average values of the total polymer that comprise the hollow crosslinked particles. For example, in the below-mentioned production methods (I) to (IV), which are favorable methods for obtaining the hollow crosslinked particles, the above proportions are calculated as the average values for the polymer of the swellable polymer particles and the polymer resulting from the polymerization carried out under the presence of the abovementioned swellable polymer particles.

Though not restricted in particular, the above-described production methods (I) to (IV) are favorable as methods of producing the above-described cationic hollow crosslinked polymer particles of the present invention. Furthermore, The descriptions that have been given in the production method of the first cationic hollow crosslinked polymer particles of the first paint composition of the above-mentioned (2) apply as well in this production methods (I) to (IV).

[Film-Forming Cationic Resin]

The film-forming cationic resin (shall also be referred to hereinafter simply as "cationic resin") that is contained in the cationic electrodeposition paint composition of the present invention is not restricted in particular as long as it has cationic groups and can form a film upon reacting with the curing agent in the stoving process that follows cationic electrodeposition. Here, the cationic groups are the same in definition as the cationic groups of the hollow crosslinked particles, and the same specific examples as those given for the cationic groups of the hollow crosslinked particles can be given here as well.

Such cationic resins are well known and examples include such cationic resins as amine-modified epoxy resins, such as those described in Japanese Patent Publication Nos. 4978 of 1979 and 34186 of 1981, Japanese Laid-open Patent Publication No. 204338 of 1998, and the like, amine-modified polyurethane polyol resins, such as those described in Japanese Laid-open Patent Publication No. 115476 of 1980, amine-modified polybutadiene resins, such as those described in Japanese Patent Publication No. 61077 of 1987, Japanese Laid-open Patent Publication No. 86766 of 1988, and the like, and amine-modified acrylic resins, such as those disclosed in Japanese Laid-open Patent Publication No. 139909 of 1988, Japanese Patent Publication No. 60516 of 1989, and the like. Other cationic resins such as sulfonium-group-containing resins and phosphonium-group-containing resins are also known and can be used.

Among the above, amine-modified cationic resins are preferable as the cationic resin.

As an example of amine-modified cationic resins, amine-modified epoxy resins shall now be described in detail. An amine-modified epoxy resin is typically produced by ring-opening all epoxy rings of a bisphenol type epoxy resin by means an active hydrogen compound that can introduce cationic groups or by ring-opening part of the epoxy rings by means of another active hydrogen compound and ring-opening the remaining epoxy rings by means of an active hydrogen compound that can introduce cationic groups.

A typical example of a bisphenol type epoxy resin is the bisphenol A type or bisphenol F type epoxy resin. Commercially available products of the former include Epicoat 828 (Yuka Shell Epoxy Co., Ltd.; epoxy equivalent: 180 to 190), Epicoat 1001 (ibid; epoxy equivalent: 450 to 500), Epicoat 1010 (ibid; epoxy equivalent: 3000 to 4000), and the like, and commercially available products of the latter include Epicoat 807 (ibid; epoxy equivalent: 170). It is also possible to start from an epoxy resin containing an oxazolidone ring in the chain as indicated in Japanese Laid-open Patent Publication Nos. 306327 of 1993, 329755 of 1994, and 33848 of 1995.

Primary amines and secondary amines may be given as examples of active hydrogen compounds that can introduce cationic groups. Specific examples include butylamine, octylamine, diethylamine, dibutylamine, methylbutylamine, monoethanolamine, diethanolamine, N-methylethanolamine, and the like, and secondary amines formed by blocking primary amines, such as the ketimine of aminoethylethanolamine and the diketimine of diethylenetriamine. A plurality of amines may also be used in combination.

Other active hydrogen compounds that can be used for ring-opening the epoxy ring include monophenols, such as phenol, cresol, nonylphenol, nitrophenol, and the like.; monoalcohols, such as hexyl alcohol, 2-ethylhexanol, stearyl alcohol, monobutyl or monohexyl ethers of ethylene glycol or propylene glycol, and the like.; aliphatic monocarboxylic acids, such as stearic acid, octyl acid, and the like.; aliphatic hydroxycarboxylic acids, such as glycolic acid, dimethylolpropionic acid, hydroxypibaric acid, lactic acid, citric acid, and the like.; and mercaptoalkanols, such as mercaptoethanol.

It is known that a chain-elongated epoxy resin containing an oxazolidone ring can be obtained by reacting a bifunctional epoxy resin with bisurethane. In other words, a diisocyanate compound blocked by a monoalcohol. An amine-modified epoxy resin, obtained by ring-opening the epoxy ring of such an epoxy resin by means of an amine, may also be used. Also, when an asymmetric bisurethane compound, with which one of the isocyanate groups of a diisocyanate compound is blocked reversibly by a monoalcohol and the other isocyanate group is blocked irreversibly by a hydroxyl-group-containing compound that becomes a soft segment, is reacted with a bifunctional epoxy resin by the method described in Japanese Laid-open Patent Publication No. 33848 of 1995, a modified epoxy resin that contains an oxazolidone ring and a soft segment can be obtained. By ring-opening the epoxy ring of such a modified epoxy resin using an amine or other active hydrogen compound that can introduce a cationic group, a cationic modified epoxy resin can be obtained.

With this method, the hydroxyl compound that irreversibly blocks the other isocyanate group of the diisocyanate compound is an aliphatic monoalcohol with four or more carbons, such as butanol, 2-ethylhexanol, and the like, a long-chain alkyl phenol, such as nonyl phenol, or a glycol monoether, such as the mono 2-ethylhexyl ether of ethylene glycol or propylene glycol.

An above-described cationic modified epoxy resin may also be produced by the method described in Japanese Laid-open Patent Publication No. 329755 of 1994. In this case, in place of the diisocyanate compound blocked by a monoalcohol, a prepolymer, with which the terminal isocyanate group of a prepolymer, obtained by the reaction of a bifunctional active hydrogen compound, which is to become the soft segment, and a diisocyanate compound, is reversibly blocked, is made to react with a bifunctional epoxy resin, and the remaining epoxy rings are opened by an active hydrogen compound that can introduce a cationic group. Examples of the bifunctional active hydrogen compound that is to become the soft segment include polyether diols, polyester diols, polyoxyalkylenediamines, bifunctional long-chain aliphatic acids, carboxyl-group-terminated nitrile rubber oligomers, hydroxyl-group-terminated polybutadiene oligomers, and the like.

In the above, cationic resins were described using amine-modified epoxy resins as examples.

The cationic resin is blended in the cationic electrodeposition paint composition (the solids from which solvent has been removed) at an amount of preferably 5 to 99.9 weight %, more preferably 10 to 99 weight %, and especially preferably 20 to 90 weight %. With a blending amount of greater than 99.9 weight %, the hiding property will be poor, and with a blending amount of less than 5 weight %, a film will not be formed adequately.

[Curing Agent]

The cationic electrodeposition paint composition of the present invention preferably contains a curing group with a functional group, such as the isocyanate group or epoxy group. Among these, blocked polyisocyanates are more preferable. Blocked polyisocyanates with a dissociation temperature of 100 to 160° C. are even more preferable. The blocked polyisocyanate maybe bonded to another component. For example, a half-blocked polyisocyanate may be reacted with the cationic resin to add crosslinking ability to the cationic resin.

If a curing agent is not contained, the curing property will be inadequate. If a blocked polyisocyanate with a dissociation temperature in the range of 100 to 160° C. is used, the fluidity of the coat will be good and the smoothness of flat parts will be improved. The stability of the paint will be good and since the curing property will be good even when low-temperature stoving is performed, the anti-corrosion property will be improved.

Though polyisocyanates that have been used conventionally as vehicle components for electrodeposition paints may also be used as the blocked polyisocyanate, a blocking agent must be selected in the case of low-temperature curing.

Representative examples of polyisocyanates are as follows.

Aliphatic diisocyanates, such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate, and butylidene diisocyanate;

alicyclic diisocyanates, such as 1,3-cyclopentane diisocyanate, 1,4-cyclohexane diisocyanate, 1,2-cyclohexane diisocyanate, and isophoron diisocyanate, aromatic diisocyanates, such as m-phenylene diisocyanate, p-phenylene diisocyanate, 4,4'-diphenyl diisocyanate, 1,5-naphthalene diisocyanate, and 1,4-naphthalene diisocyanate;

aliphatic-aromatic diisocyanates, such as 4,4'-diphenylmethane diisocyanate, 2,4- and 2,6-toluene diisocyanates and mixtures thereof, $4,4^1$-toluidine diisocyanate, and 1,4-xylene diisocyanate;

nucleus-substituted aromatic diisocyanates, such as dianicidine diisocyanate, 4,4'-diphenyl ether diisocyanate, chlorodiphenyl diisocyanate, and the like.; triisocyanates, such as triphenylmethane-4,4',4"-triisocyanate, 1,3,5-triisocyanatebenzene, and 2,4,6-triisocyanatetoluene;

tetraisocyanates, such as 4,4'-diphenyl-dimethylmethane-2,2',5,5'-tetraisocyanate; and polyisocyanates, such as toluene diisocyanate dimer and toluene diisocyanate trimer.

The blocking agent may be used under the presence of a catalyst. Examples of a blocking agent for an aromatic polyisocyanate include halogenated hydrocarbons, such as 1-chloro-2-propanol and ethylene chlorohydrin, aliphatic and heterocyclic alcohols, such as n-propanol, furfuryl alcohol, and alkyl-substituted furfuryl alcohols, phenols, such as phenol, m-cresol, p-nitrophenol, p-chlorophenol, and nonylphenol, oximes, such as methyl ethyl ketone oxime, methyl isobutyl ketone oxime, acetone oxime, and cyclohexane oxime, active methylene compounds, such as acetylacetone, ethyl acetoacetate, and ethyl malonate, as well as caprolactam, and the like. Among the above, oximes and phenols are especially favorable, and among the alcohols, furfuryl alcohol and alkyl-substituted furfuryl alcohols are especially favorable. In the case of an aliphatic polyisocyanate, phenols and oximes are favorable among the above.

If a dissociation catalyst for a blocked polyisocyanate curing agent is to be used, an organic tin compound, such as dibutyltin laurate, dibutyltin oxide, dioctyltin, and the like, an amine, such as N-methyl morpholine, and the like, or a metal salt, such as lead acetate and salts of strontium, cobalt, copper, and the like, can be used. The concentration of the catalyst is normally set to 0.1 to 6 weight % of the solids of the coat-forming resin in the cationic electrodeposition paint.

A curing agent is blended as necessary. The amount of curing agent blended in the cationic electrodeposition paint composition is normally 0.01 to 50 weight % and preferably 0.1 to 40 weight % with respect to the film-forming cationic resin. If the blended amount is less than 0.01 weight %, the effect of adding the curing agent will be inadequate. If the amount exceeds 50 weight %, a large amount of desorbed matter will be generated during the stoving of the coat and lead to such problems as lowering of the smoothness of the coat, pollution by large amounts of tar and smoke, and the like.

[Pigment]

Examples of pigment components that can be used in addition to the above-described cationic hollow crosslinked polymer particles in the present invention's cationic electrodeposition paint composition include coloring pigments, such as titanium dioxide, carbon black, red iron oxide, and the like.; rustproofing pigments, such as basic lead silicate, aluminum phosphomolybdate, and the like.; and extender pigments, such as kaolin, clay, talc, and the like. These pigments may be prepared as a pigment paste using a known method and this paste may be blended in the cationic electrodeposition paint composition.

In addition to the above components, the cationic electrodeposition paint composition of the present invention may contain various other additives and solvents as necessary.

Examples of additives include acids, such as formic acid, acetic acid, lactic acid, sulfamic acid, and the like, and surfactants that are used for dispersing the film-forming cationic resin in an aqueous medium. The concentration of such additives is normally set to 0.1 to 15 weight % and preferably 0.1 to 5 weight % with respect to the film-forming cationic resin in the cationic electrodeposition paint.

Though the cationic electrodeposition paint composition of the present invention is dispersed in an aqueous medium, various organic solvents may be used in addition to water in the aqueous medium for adjustment of the dissolution of the resin, viscosity, and the like. Examples of solvents that can be used include hydrocarbons (for example, xylene and toluene), alcohols (for example, methyl alcohol, n-butyl alcohol, isopropyl alcohol, 2-ethylhexyl alcohol, ethylene glycol, propylene glycol), ethers (for example, ethylene glycol monoethyl ether, ethylene glycol monobutyl ether, ethylene glycol monohexyl ether, propylene glycol monoethyl ether, 3-methyl-3-methoxybutanol, diethylene glycol monoethyl ether, diethylene glycol monobutyl ether), ketones (for example, methyl isobutyl ketone, cyclohexanone, isophoron, acetylacetone), esters (for example, ethylene glycol monoethyl ether acetate, ethylene glycol monobutyl ether acetate), and mixtures of the above.

The usage amount of such solvents is preferably 0.01 to 25 weight % and especially preferably 0.05 to 15 weight % of the total amount of the paint components, including the solvents.

Electrodeposition coating using the present invention's cationic electrodeposition paint composition is carried out under conditions that have been used normally since priorly, such as a coating bath temperature of 20 to 40° C., application voltage of 50 to 500V, and conduction time of 30 seconds to 10 minutes with the object to be coated being completely immersed in the coating bath. The necessary thickness of the electrodeposited coat, as the coat thickness after stoving, is preferably 5 to 50 μm and more preferably 10 to 35 μm.

Stoving of the electrodeposited coat is normally performed for 5 minutes to 50 minutes at a coated object temperature of 100° C. to 200° C. and preferably 130° C. to 160° C. However, the rustproofing property will not be lowered even if stoving is performed at a high temperature of 160° C. or more.

Metal materials to which the electrodeposition coating using the present invention's cationic electrodeposition paint composition may be applied include metals that are generally subject to electrodeposition coating since priorly, for example, iron, copper, zinc-plated materials, aluminum, as well as alloys and conversion-treated materials of such metals.

(4) Resin Composition

The resin composition of the present invention shall now be described in detail.

First, the components that comprise the resin composition shall be described.

[Cationic Hollow Crosslinked Polymer Particles]

The cationic hollow crosslinked polymer particles (shall also be referred to hereinafter as "hollow crosslinked particles") are such that the zeta potential as measured in an aqueous medium of pH 2 to 9 is in the range of +5 to +100 mV and preferably +10 to +60 mV.

With a preferred embodiment, the hollow crosslinked particles are such that the volume hollowness is in the range of 1 to 80% and preferably 3 to 40%, and the average particle diameter is in the range of 0.03 to 10 $\mu$m and preferably 0.1 to 5 $\mu$m.

The zeta potential is an indicator that expresses the ionicity of the particles, and that the zeta potential of the hollow crosslinked particles of the present invention lies in the abovementioned range indicates that the hollow crosslinked particles are cationic in a wide range of acidic to basic environments. That is, the hollow crosslinked particles will exhibit a strong binding force with an anionic matrix resin in a wide range of acidic to basic surroundings.

The zeta potential of the hollow crosslinked particles is measured by the method that has been described above.

The volume hollowness is the volumetric proportion taken up by the void in each particle and is preferably in the range of 1 to 80%. If the volume hollowness is less than 1%, the particles will practically not function as hollow crosslinked particles. A volume hollowness in the excess of 80% is not favorable since the strength will be lowered.

With the present invention, the volume hollowness is measured by the method that has been described above.

As has been mentioned above, the hollow crosslinked particles have an average particle diameter preferably in the range of 0.03 to 10 $\mu$m and are microparticulate. When the particle diameter is in this range, favorable results can be obtained in terms of the stability of dispersion in the matrix resin, strength, and stability of the dispersion. Hollow crosslinked particles of an average particle diameter of less than 0.03 $\mu$m are difficult to obtain in terms of production and an average particle diameter in the excess of 10 $\mu$m is unfavorable as the mechanical strength will be lowered.

With the present invention, the average particle diameter is measured by the method that has been described above.

Since the above-described cationic hollow crosslinked polymer particles express a strong binding force with an anionic matrix resin in a wide range of acidic to basic surroundings and have adequate strength and dispersion properties, they are excellent as a filler for resin or as a white pigment.

It is furthermore preferable for the hollow crosslinked particles to have the following characteristics.

First, the hollow crosslinked particles preferably has solvent resistance against organic solvents, such as toluene, alcohol, and the like. By having solvent resistance, an advantage is provided in that the shapes of the particles will be maintained when the particles are dispersed in a solvent and blended in the resin. To be more specific, the parts dissolved in toluene at 25° C. is preferably 10% or less.

Furthermore, the hollow crosslinked particles preferably has heat resistance. By having heat resistance, an advantage is provided in that the shapes of the particles will be maintained in a high-temperature dispersion process (for example, a kneading process) when the particles are used as a filler. To be more specific, the 10% mass reduction temperature as measured by a heat balance (TGA) is preferably 240° C. or more.

Such solvent resistance and heat resistance can be expressed by suitable selection of the monomer species.

Examples of the polymers that comprise the cationic hollow crosslinked polymer particles include thermoplastic resins and thermosetting resins, such as acrylic resins, polystyrene resins, polyolefin resins, polyester resins, polycarbonate resins, polyurethaneresins, phenol resins, epoxyresins, ionomerresins, vinyl chloride resins, fluororesins, butadiene resins, and the like. It is essential for at least part of the abovementioned polymers that comprise the hollow crosslinked particles to have a cationic group.

With the present invention, cationic groups include amino groups and other groups that can bind with a proton to form a cation and groups that form the cationic part of salts resulting from reactions of the abovementioned groups with an acid.

Specific examples of cationic groups include primary amino groups, secondary amino groups, tertiary amino groups; quaternary amino groups, secondary imino groups, tertiary imino groups, quaternary imino groups; amidino groups, imidino groups, and hydrazino groups of various valences; the pyridyl group and other annular groups that contain a nitrogen atom, and the like.

The concentration of the cationic groups in the hollow crosslinked particles of the present invention is preferably 0.05 to 300 mmol per 100 g of particles and more preferably 1 to 100 mmol per 100 g of particles.

The hollow crosslinked particles are preferably comprised of structural units that are derived from a crosslinking monomer and structural units that are derived from another monomer that is copolymerizable with the abovementioned crosslinking monomer. The proportion of the structural units derived from a crosslinking monomer is preferably 5 to 90 weight %, more preferably 10 to 60 weight %, and even more preferably 15 to 50 weight %, and the proportion of the structural units derived from the other monomer is preferably 95 to 10 weight %, more preferably 90 to 40 weight %, and even more preferably 85 to 50% (here, the total amount of the two types of structural units is 100 weight %).

That structures derived from a crosslinking monomer exists in the abovementioned range in the hollow crosslinked particles signify that the hollow crosslinked particles possess many crosslinked structures and thus that the hollow crosslinked particles will have good strength and heat resistance and bring about favorable results.

Here, the proportions of the structural units derived from the crosslinking monomer and the proportions of the structural units derived from the other monomer are average values of the total polymer that comprise the hollow crosslinked particles. For example, in the above-described production methods (I) to (IV), which are favorable methods for obtaining the hollow crosslinked particles, the above proportions are calculated as the average values for the polymer of the swellable polymer particles and the polymer resulting from the polymerization carried out under the presence of the abovementioned swellable polymer particles.

Though not restricted in particular, the above-described production methods (I) to (IV) are favorable as methods of producing the above-described cationic hollow crosslinked polymer particles of the present invention. With these production methods (I) to (IV), the indications, given with regard to the method of producing the first cationic hollow crosslinked polymer particles of the first paint composition in (2) above, apply.

Such a production method (IV) has the characteristic that hollow crosslinked particles with extremely few aggregates can be obtained.

[Resin Component]

Examples of the resin component of the present invention's resin composition include thermoplastic resins and thermosetting resins.

The abovementioned thermoplastic resins include amorphous polymers, crystalline polymers, liquid crystal polymers, and the like. Specific examples include styrene resins, rubber-reinforced styrene resins, vinyl chloride resins, acrylic resins, polyphenylene ether resins, polyarylene sulfide resins, polycarbonate resins, polyester resins, polyamide resins, polyacetal resins, polyether sulfone resins, polysulfone resins, polyimide resins, and polyolefin resins.

Styrene resins that are useful for the present invention includepolystyrene, polychlorostyrene, poly-α-methylstyrene, styrene-acrylonitrile copolymer, styrene-methyl methacrylate copolymer, styrene-maleic anhydride copolymer, styrene-α-methylstyrene copolymer, styrene-α-methylstyrene-methyl methacrylate copolymer, styrene-α-methylstyrene-acrylonitrile-methyl methacrylate copolymer, and the like. One of the above polymers may be used singularly or two or more such polymers may be used in combination.

Rubber-reinforced styrene resins that are useful for the present invention include high-impact polystyrene, ABS resin, AES resin, AAS resin, MBS resin, and resins, with which a styrene-butadiene block copolymer or the hydrogenate of this copolymer is used in place of the butadiene rubber, which is the rubber component of the abovementioned high-impact polystyrene, ABS resin, AES resin, AAS resin, and MBS resin. One of the above resins may be used singularly or two or more such resins may be used in combination. Combined use with an abovementioned styrene resin is also possible.

Vinyl chloride resins that are useful for the present invention include polyvinyl chloride and copolymers of vinyl chloride with a compound with at least one double bond that enables copolymerization with 50 weight % or less and preferably 45 weight % or less of vinyl chloride.

Specific examples of such a compound with at least one double bond that enables copolymerization include vinylidene chloride, ethylene, propylene, vinyl acetate, (meth)acrylic acid, and their esters, maleic acid and its esters, acrylonitrile, and the like. The degree of polymerization of the vinyl chloride resin is normally 400 to 4500 and especially preferably 400 to 1500.

The polyarylene sulfide resins that are useful for the present invention are those that contain 70 mole % or more of structural units expressed by the formula: —(Ar—S)—.

Here, Ar indicates an aromatic group with six or more carbon atoms, such as p-phenylene, m-phenylene, 2,6-napthalene, 4,4'-biphenylene, p,p'-bibenzyl, and their nucleus-substituted forms. Of the above, poly-p-phenylene sulfide, which has an unsubstituted p-phenylene nucleus, in other words, the structural formula indicated below, is preferable in terms of fabrication properties:

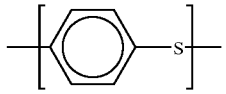

Examples of polycarbonate resins that are useful for the present invention include aromatic polycarbonate resins, aliphatic polycarbonate resins, aliphatic-aromatic polycarbonate resins, and the like. These are generally polymers or copolymers, which are obtained by polymerizing a bisphenol, such as a 2,2-bis(4-oxyphenyl) alkane system, bis(4-oxyphenyl) ether system, bis(4-oxyphenyl)sulfone sulfide or sulfoxide, and the like, and, where necessary, may be a polymer that uses a bisphenol that has been substituted with a halogen.

Representative examples of polyester resins that are useful for the present invention include poly(ethylene terephthalate) (PET), poly(propylene terephthalate), poly (butylene terephthalate), poly(pentamethylene terephthalate), poly(hexamethylene terephthalate), and other polyester resins that are obtained from an aromatic dicarboxylic acid and a dihydric alcohol.

Examples also include so-called polyarylate resins, which are aromatic polyester resins obtained from an aromatic dicarboxylic acid and an aromatic diphenol. Specific examples of such polyarylate resins include polyester resins and copolyester resins obtained from bisphenol A and terephthalic acid or isophthalic acid.

Among these, PET and PBT are especially favorable.

Examples of polyamide resins that are useful for the present invention include those produced by the condensation of a linear adimine expressed by the formula, $H_2N$—$(CH_2)x$—$NH_2$ (wherein, x is an integer from 3 to 12), and a linear dicarboxylic acid expressed by the formula, $HOOC$—$(CH_2)_y$—$COOH$ (wherein, y is an integer from 2 to 12), as well as resins produced by ring-opening polymerization of a lactam.

Favorable examples of such polyamide resins include nylon 6,6, nylon 6,10, nylon 6,12, nylon 4,6, nylon 3,4, nylon 6,9, nylon 6, nylon 12, nylon 11, nylon 4, and the like. Copolymer polyamides, such as nylon 6/6,10, nylon 6/6,12, nylon 6/4,6, nylon 6/12, nylon 6/6,6, nylon 6/6,6/6,10, nylon 6/4,6/6,6, nylon 6/6,6/6,12, nylon 6/4,6/10, nylon 6/4,6/12, and the like, are also favorable.

Further examples include semi-aromatic polyamide resins, which are obtained from an aromatic dicarboxylic acid, such as nylon 6/6,T (T: terephthalic acid component), terephthalic acid, isophthalic acid, and the like, and meta-xylilene diamine or an aliphatic diamine, as well as polyamide resins, polyester amide resins, polyether amide resins, and polyester ether amide resins, and the like, which are obtained from meta-xylilene diamine and the above-described linear dicarboxylic acids.

Examples of polyolefin resins include polyethylene, polypropylene, and the like.

Examples of thermosetting resins that can be used as a resin component of the present invention include phenol resins, epoxy resins, melamine resins, unsaturated polyester resins, alkyd resins, and the like, and in terms of the ease of kneading work, a phenol resin, epoxy resin, or unsaturated polyester resin is preferable and a phenol resin or an epoxy resin is even more preferable.

With regard to the proportions of the resin component and the cationic hollow crosslinked polymer particles in the resin composition of the present invention, the proportion of the resin component is preferably 30 to 99.9 weight %, more preferably 50 to 99.9 weight %, and especially preferably 50 to 99.5 weight %, and the proportion of the cationic hollow crosslinked polymer particles is preferably 70 to 0.1 weight %, more preferably 50 to 0.1 weight %, and especially preferably 50 to 0.5 weight % (here, the total amount of the two components is 100 weight %).

If the proportion of the cationic hollow crosslinked polymer particles is less than 0.1 weight %, the effects of adding the particles cannot be obtained, and a proportion of particles in the excess of 70 weight % is unfavorable as the performance of the resin component is lowered.

Methods of mixing the thermoplastic resin, which is the resin component of the composition of the present invention, and the cationic hollow crosslinked polymer particles include, for example, the method of directly mixing a powder or pellets of the thermoplastic resin and a powder of the cationic hollow crosslinked polymer particles, and the method of obtaining a resin composition using the thermoplastic resin as the resin component by blending a latex of the thermoplastic resin, obtained by emulsion polymerization, with a latex of the cationic hollow crosslinked polymer particles and thereafter performing the respective processes of co-aggregation, recovery of polymer components, drying, and the like.

The above-described method of latex blending is favorable in the case where the thermoplastic resin that is used is obtained by emulsion polymerization, for example, in the case where the thermoplastic resin is ABS resin or other rubber-reinforced styrene resin.

Also, a known antioxidant, for example, 2,6-di-tert-butyl-4-methylphenol, 2-(1-methylcyclohexyl)-4,6-dimethylphenol, 2,2'-methylene-bis(4-ethyl-6-tert-butylphenol), 4,4'-thiobis-(6-tert-butyl-3-methylphenol), dilauryl thiodipropionate, tris(di-nonylphenyl) phosphate, or wax; a known ultraviolet light absorber, for example, p-tert-butylphenyl salicylate, 2,2'-dihydroxy-4-methoxybenzophenone, or 2-(2'-hydroxy-4'-n-octoxyphenyl) benzothiazole; a known lubricant, for example, silicone oil, paraffin wax, stearic acid, hardened oil, stearoamide, methylene bis-stearoamide, n-butyl stearate, ketone wax, octyl alcohol, lauryl alcohol, or hydroxystearic acid trigliceride; a known fire retardant, for example, antimony oxide, aluminum hydroxide, zinc borate, tricresyl phosphate, chlorinated paraffin, tetrabromobutane, hexabromobenzene, or tetrabromobisphenol A; a known antistatic agent, for example, stearoamide propyldimethyl-β-hydroxyethylammonium nitrate; a known coloring agent, for example, titanium oxide, carbon black, or other inorganic or organic pigment, a known filler, for example, calcium carbonate, clay, silica, glass fiber, glass beads, carbon fiber, and the like, may be added as necessary to the above-described resin composition.

The preferable method of mixing the thermosetting resin and the cationic hollow crosslinked polymer particles is the method of heat mixing. For mixing, a Banbury mixer or other sealed type mixer, a roller, or an extruder, and the like, may be used according to the purpose.

Even in the case of a composition with which the resin component is a thermosetting resin, the abovementioned age resistors or antioxidants, softening agents, various inorganic and organic fillers, reinforcing agents, crosslinking agents, glass fibers, metal fibers, carbon fibers, and the like, may be blended as necessary.

With the composition using the thermosetting resin, the desired molded product may be obtained using a molding method, for example, the hand lay-up method, spray-up method, FW method, SMC method, continuous drawing method, BMC method, premixing method, prefoaming method, FRP method, and the like, that are described in pp. 80 and 81 of "Introduction to Plastics" (issued by the Industrial Research Association).

The resin composition of the present invention that has a thermoplastic resin as the resin component can by itself be used as the molding material for various known molded products in accordance with the type of thermoplastic resin.

Meanwhile, the resin composition of the present invention that has a thermosetting resin as the resin component can by itself be used in known applications as covering material, casting material, molding material, adhesive, paints, and the like, for example, mainly for electric and electronic parts, automobiles, and building materials.

(5) Filled Paper, Paper Coating Composition, and Coated Paper

The filled paper, paper coating composition, and coated paper of the present invention shall now be described in detail.

First, the cationic hollow crosslinked polymer particles that are contained in these items shall be described.

[Cationic Hollow Crosslinked Polymer Particles]

The cationic hollow crosslinked polymer particles (shall also be referred to hereinafter as "hollow crosslinked particles") are such that the zeta potential as measured in an aqueous medium of pH 2 to 9 is in the range of +5 to +100 mV and preferably +10 to +60 mV, and (II) are comprised of 5 to 90 weight %, preferably 10 to 60 weight %, and more preferably 15 to 50 weight % of structural units derived from a crosslinking monomer and 95 to 10 weight %, preferably 40 to 90 weight %, and more preferably 50 to 85% of structural units derived from another monomer that is copolymerizable with the crosslinking monomer (here, the total amount of the two types of structural units is 100 weight %).

With a preferred embodiment, the hollow crosslinked particles are such that the volume hollowness is in the range of 1 to 80% and preferably 3 to 40%, and the average particle diameter is in the range of 0.03 to 10 $\mu$m, preferably 0.05 to 7 $\mu$m, more preferably 0.1 to 5 $\mu$m, and especially preferably 0.2 to 3 $\mu$m.

The zeta potential is an indicator that expresses the ionicity of the particles, and that the zeta potential of the hollow crosslinked particles of the present invention lies in the abovementioned range indicates that the hollow crosslinked particles are cationic in a wide range of acidic to basic environments.

Thus with a filled paper containing the above-described hollow crosslinked particles as the filler, the affinity of the hollow crosslinked particles with the fibers will be good and the strength of the paper will be increased. Also, with a paper coating composition containing the hollow crosslinked particles, favorable results are obtained in that the affinity with the fibers of the coated paper and the affinity with the binder component will be improved.

The zeta potential of the hollow crosslinked particles is measured by the method that has been described above.

As has been mentioned above, the hollow crosslinked particles used in the present invention are comprised of 5 to 90 weight % of structural units derived from a crosslinking monomer and 95 to 10 weight % of structural units derived from another monomer that is copolymerizable with the crosslinking monomer.

That structures derived from a crosslinking monomer exists in the abovementioned range in the hollow crosslinked particles signify that the hollow crosslinked particles possess many crosslinked structures and thus that the hollow crosslinked particles of the present invention will have good strength and heat resistance and bring about favorable results. Such favorable results cannot be obtained if the amount of the structures derived from a crosslinking monomer is less than 5 weight %.

Here, the proportions of the structural units derived from the crosslinking monomer and the proportions of the structural units derived from the other monomer are average values for the total polymer that comprise the hollow crosslinked particles. For example, in the above-described production methods (I) to (IV), which are favorable methods for obtaining the hollow crosslinked particles, the above proportions are calculated as the average values for the polymer of the swellable polymer particles and the polymer resulting from the polymerization carried out under the presence of the abovementioned swellable polymer particles.

The volume hollowness is the volumetric proportion taken up by the void in each particle. If the volume hollowness is less than 1%, the particles will practically not function as hollow crosslinked particles. A volume hollowness in the excess of 80% is not favorable since the strength will be lowered.

With the present invention, the volume hollowness is measured by the method that has been described above.

As has been mentioned above, the hollow crosslinked particles have an average particle diameter preferably in the range of 0.03 to 10 μm and are microparticulate. When the particle diameter is in this range, the hollow crosslinked particles will be dispersed well in the papermaking process of the filled paper. Also for the paper coating composition, favorable results can be obtained in terms of the dispersion in the coating medium, coat strength, and stability of the paint. Hollow crosslinked particles of an average particle diameter of less than 0.03 μm are difficult to obtain in terms of production and an average particle diameter in the excess of 10 μm is unfavorable as the dispersion property will be unstable.

With the present invention, the average particle diameter is measured by the method that has been described above.

Since the above-described cationic hollow crosslinked polymer particles contained in the paint composition of the present invention maintain a cationic property in a wide range of acidic to basic surroundings and have adequate strength and dispersion properties, they are excellent as a filler for filled paper and also as a white pigment for coating.

It is furthermore preferable for the hollow crosslinked particles to have the following characteristics.

First, the hollow crosslinked particles preferably has solvent resistance against organic solvents, such as toluene, alcohol, and the like. By having solvent resistance, an advantage is provided in that whiteness will be maintained when the filled paper or coated paper comes in contact with an organic solvent. To be more specific, the parts dissolved in toluene at 25° C. is preferably 10% or less.

Furthermore, the hollow crosslinked particles preferably has heat resistance. By having heat resistance, an advantage is provided in that the shapes of the particles will be maintained even in a high-temperature drying process in the coated paper production process. To be more specific, the 10% mass reduction temperature as measured by a heat balance (TGA) is preferably 240° C. or more.

Such solvent resistance and heat resistance can be expressed by suitable selection of the monomer species.

Examples of the polymers that comprise the cationic hollow crosslinked polymer particles include thermoplastic resins and thermosetting resins, such as acrylic resins, polystyrene resins, polyolefin resins, polyester resins, polycarbonate resins, polyurethane resins, phenol resins, epoxy resins, ionomer resins, vinyl chloride resins, fluororesins, butadiene resins, and the like. It is essential for at least part of the abovementioned polymers that comprise the hollow crosslinked particles to have a cationic group.

With the present invention, cationic groups include amino groups and other groups that can bind with a proton to form a cation and groups that form the cationic part of salts resulting from reactions of the abovementioned groups with an acid.

Specific examples of cationic groups include primary amino groups, secondary amino groups, tertiary amino groups; quaternary amino groups, secondary imino groups, tertiary imino groups, quaternary imino groups; amidino groups, imidino groups, and hydrazino groups of various valences; the pyridyl group and other annular groups that contain a nitrogen atom, and the like.

The concentration of the cationic groups in the hollow crosslinked particles of the present invention is preferably 0.05 to 300 mmol per 100 g of particles, more preferably 1 to 200 mmol per 100 g of particles, and even more preferably 1 to 100 mmole per 100 g of particles.

Though not restricted in particular, the above-described production methods (V) to (VIII) are favorable as methods of producing the above-described cationic hollow crosslinked polymer particles of the present invention.

Such a production method (VIII) has the characteristic that hollow crosslinked particles with extremely few aggregates can be obtained.

The cationic hollow crosslinked polymer particles have been described above. The filled paper and then the paper coating composition of the present invention shall now be described.

[Filled Paper]

The filled paper of the present invention has water-dispersible fibers as the main body and contains the above-described cationic hollow crosslinked polymer particles as the filler. The cationic hollow crosslinked polymer particles are used at a proportion of normally 0.1 to 50 weight % and preferably 0.5 to 10 weight % with respect to the total amount of 100%, including the water-dispersible fibers.

The water-dispersible fibers need only to be dispersible in water, and conventionally used fibers, for example, chemical pulps, such as unbleached kraft pulps, bleached kraft pulps, and the like, other pulps such as mechanical pulps, semi-chemical pulps, synthetic wood pulps, and the like, and pulps obtained from recovered used paper, and the like, can be used favorably.

If desired, inorganic fibers, such as glass fiber, rock wool, and the like, synthetic fibers, such as polyester, nylon, polyacrylonitrile, and the like, ceramic fibers, wheat straw, cotton flocks, and the like, may be used in combination with an abovementioned pulp.

The filled paper of the present invention contains the above water-dispersible fibers at a proportion of normally 50 to 99 weight %, preferably 50 to 95 weight %, and more preferably 70 to 95 weight %.

Though there are no particular restrictions concerning the weight and thickness of the filled paper of the present invention, the weight is normally in the range of 20 to 500 g/cm².

With the filled paper of the present invention, in addition to the water-dispersible fibers and cationic hollow crosslinked polymer particles, a filler besides the hollow crosslinked particles may be used in combination as necessary.

Examples of fillers besides the above-described hollow crosslinked particles include titanium oxide, silica, zincoxide, barium sulfate, calcium carbonate, calcium oxide, aluminum silicate, diatomaceous earth, clay, magnesium hydroxide, talc, and the like.

Furthermore, various additives that are normally used in papermaking processes, such as latex, starch, and other adhesive agents and aggregation agents may be added suitably to the filled paper of the present invention.

A representative example of the method of producing the filled paper of the present invention shall now be described.

First, after beating the water-dispersible fibers, the fibers are dispersed in a prescribed amount of water, and a slurry is made by adding the cationic hollow crosslinked polymer particles and, where necessary, a filler besides the cationic hollow crosslinked polymer particles, additives, aggregation agents, adhesive agents, and the like. This slurry is then put in a known papermaking machine and then dried to produce the filled paper. Thereafter, a calendering process, and the like, may be performed as necessary.

The pH of the abovementioned papermaking slurry is preferably 9 or less, and if the pH is higher, the yield tends to decrease. If an inorganic filler, such as talc, clay, and the like, is to be used as a filler, the yield may be increased by using an adhesive agent in combination or by increasing the amount of the cationic hollow crosslinked polymer particles.

The filled paper of the present invention may be used as it is or as the base paper for coated paper.

The paper coating composition of the present invention shall now be described.

[Paper Coating Composition]

The paper coating composition of the present invention contains (A) the above-described cationic hollow crosslinked polymer particles as the pigment component and (B) a binder component for binding the pigment component. The binder component (solids) (B) is blended at a proportion of preferably 1 to 100 weight parts, more preferably 3 to 50 weight parts, and especially preferably 5 to 30 weight parts per 100 weight parts of the cationic hollow crosslinked polymer particles (A) A blending proportion of the binder component (B) of less than 1 weight part is unfavorable since the adhesion strength will then be significantly low and blanket soiling, and the like, will tend to occur during printing. On the other hand, the white paper gloss, whiteness, opacity, and the like, will be low if the proportion exceeds 100 weight parts.

As the binder component (B) in the paper coating composition of the present invention, a latex, obtained by polymerizing a conjugated diene and another monomer as necessary, an acrylic polymer latex, a vinyl acetate polymer latex, casein, modified casein, starch, modified starch, polyvinyl alcohol, carboxymethylcellulose, hydroxyethylcellulose, alkali-thickened emulsion, and the like, may be used. These may also be used in combination where necessary.

The abovementioned copolymer latex is a cationic copolymer latex, which is preferably comprised of:

| | |
|---|---|
| (a) conjugated diene compound | 5 to 90 (weight %) |
| (b) cationic monomer | 0.01 to 50 (weight %) |
| (c) other copolymerizable monomer | 0 to 94.99 (weight %) |

Examples of the abovementioned conjugated diene compound (a) include 1,3-butadiene, isoprene, 2-chloro-1,3-butadiene, chloroprene, and the like, and 1,3-butadiene is preferable.

Examples of the abovementioned cationic monomer (b) include those that have been mentioned above.

Examples of the other copolymerizable monomer (c) include aromatic vinyl compounds, such as styrene, α-methylstyrene, and the like, alkyl acrylates with 1 to 18 carbons in the acryl group, such as ethyl acrylate, propyl acrylate, butyl acrylate, 2-ethylhexyl acrylate, and the like, and alkyl methacrylates, such as methyl methacrylate, ethyl methacrylate, propyl methacrylate, butyl methacrylate, and the like.

For the paper coating composition of the present invention, mineral pigments and organic pigments that are generally used for paper coating can be given as pigments to be used as necessary in combination with the hollow crosslinked particles. Representative examples include inorganic pigments, such as clay, barium sulfate, titanium oxide, calcium carbonate, satin white, and the like, and organic pigments, such as polystyrene latex, urea formaldehyde resin, and the like.

Various blending agents that are generally used in paper coating compositions, for example, water resistance improvers, water resistance promoters, pigment dispersing agents, viscosity modifiers, coloring pigments, fluorescent dyes, and pH adjusters, may be blended as suited in the paper coating composition of the present invention.

The paper coating composition of the present invention can be used in various forms of printing, such as offset printing, relief printing, gravure printing, and the like.

Since the coated paper of the present invention uses specific cationic hollow crosslinked polymer particles as the pigment, light weight can be achieved, and since the particles are excellent in affinity with the paper, high quality paper with excellent pick strength can be obtained. Also, since the abovementioned cationic hollow crosslinked polymer particles are excellent in heat resistance and can withstand high temperatures in the drying process, high quality can be achieved along with excellent productivity.

Since the filled paper of the present invention uses specific cationic hollow crosslinked polymer particles as the filler, light weight can be achieved, and since the particles are cationic and thus excellent in affinity with the fibers of the filled paper, the yield of filling can be improved and high quality paper with excellent strength, heat resistance, resistance against chemicals, solvent resistance, and the like, can be obtained.

Also, since the paper coating composition and coated paper of the present invention use specific cationic hollow crosslinked polymer particles as the pigment, the coated paper can be made lightweight, and since the particles are excellent in affinity with the paper, high quality coated paper with excellent pick strength can be obtained. Also, since the abovementioned cationic hollow crosslinked polymer particles are excellent in heat resistance and can withstand high temperatures in the drying process, high quality coated paper can be obtained at excellent productivity.

[Preferred Embodiments of the Invention]

Though the present invention shall now be described specifically by way of examples, the scope of the present invention is not limited to these examples. In the description that follows, the "parts" and "%" are based on weight.

EXAMPLE 1

The cationic hollow crosslinked polymer particles and the production method thereof are examined in this set of examples.

EXAMPLE 1-1

(Preparation of Seed Particles A)

600 parts of water, 5 parts of a 27% solution of dodecyltrimethylammonium chloride (Coatamin 24P; made by Kao Corp.), 1 part of 2,2'-azobis(2-methylpropionamidine) dihydrochloride (V-50; made by Wako Pure Chemicals Ltd.), 75 parts of styrene, 10 parts of acrylonitrile, 10 parts of 2-ethylhexyl acrylate, 5 parts of quaternary methylene chloride salt of dimethylaminopropyl acrylamide, and 15 parts of t-dodecyl mercaptan were loaded in one batch into a temperature-controllable autoclave, equipped with a stirrer, reacted for 3 hours at 70° C., and, after cooling, filtered through a 300-mesh screen to obtain seed particles A, which are swellable polymer particles.

(Production of Hollow Crosslinked Particles by Polymerization)

| | |
|---|---|
| Water | 430 parts |
| Seed particles A | 10 parts (solids) |
| 2,2'-azobis(2-methylpropionamidine) dihydrochloride (V-50; made by Wako Pure Chemicals Ltd.) | 1 part |
| Methyl methacrylate | 59 parts |
| Styrene | 12 parts |
| Divinylbenzene | 28 parts |

The above were loaded in one batch, reacted for 3 hours at 70° C., and, after cooling, removed of bulky particles by filtering through a 300-mesh screen to obtain an aqueous dispersion containing cationic hollow crosslinked polymer particles. The zeta potential, volume hollowness, and average particle diameter of these hollow crosslinked polymer particles were measured using the methods described above. "Zeta-Plus," made by Brookhaven Instruments Corp, was used as the zeta potential analyzer, "JEM-100SX," made by Japan Electoronics Co., Ltd. was used as the transmission electron microscope for measuring the volume hollowness, and "LPA-3000/3100," made by Otsuka Electronics Co, Ltd. was used as the dynamic light scattering particle sizer for measuring the average particle diameter.

(Measurement Results)

Zeta potential: 40 mV at pH 2, 36 mV at pH 6, and 32 mV at pH 9

Volume hollowness 30%

Average particle diameter 0.2 μm

EXAMPLES 1-2 TO 7

(Preparation of Seed Particles B to F)

Besides using the monomers, polymerization initiators, surfactants, and chain transfer agents indicated in Table 1-1 at the amounts indicated in Table 1, seed particles B to F were obtained in the same manner as Example 1.

(Production of Hollow Crosslinked Particles by Polymerization)

Besides using the seed particles, monomers, and polymerization initiators indicated in Table 1-2 at the amounts indicated in Table 2, polymerization was carried out to obtain hollow crosslinked particles in the same manner as Example 1-1. The properties of the respective particles are shown in Table 1-2.

COMPARATIVE EXAMPLES 1-1 TO 5

Besides using the seed particles, monomers, and polymerization initiators indicated in Table 1-3 at the amounts indicated in Table 1-3, polymerization was carried out to obtain hollow crosslinked particles in the same manner as Example 1. The properties of the respective particles are shown in Table 1-3.

TABLE 1-1

| | Seed Particles | | | | | |
|---|---|---|---|---|---|---|
| | A | B | C | D | E | F |
| Monomer | | | | | | |
| Styrene | 75 | 73 | 49 | 80 | 70 | 49 |
| Acrylonitrile | 10 | 20 | 10 | 10 | 10 | 10 |
| 2-ethylhexyl acrylate | 10 | — | 41 | 10 | 10 | 10 |
| DMAPAAQ(1) | 5 | 7 | — | — | 5 | 5 |
| Divinylbenzene | — | — | — | — | 5 | — |

TABLE 1-1-continued

| | Seed Particles | | | | | |
|---|---|---|---|---|---|---|
| | A | B | C | D | E | F |
| Polymerization initiator | | | | | | |
| V-50(2) | 1 | — | 1 | — | 1 | 1 |
| Benzoyl peroxide | — | 1 | — | 1 | — | — |
| Surfactant | | | | | | |
| Coatamin 24P(3) | 5 | 2 | — | — | 5 | 5 |
| Emulgen 920(4) | — | 2 | 1 | 1 | — | 5 |
| Aquaron RN20(5) | — | — | 2 | 2 | — | 5 |
| Chain transfer agent | | | | | | |
| t-dodecyl mercaptan | 15 | 20 | 8 | 15 | — | 15 |

TABLE 1-2

| | Example | | | | | | |
|---|---|---|---|---|---|---|---|
| | 1-1 | 1-2 | 1-3 | 1-4 | 1-5 | 1-6 | 1-7 |
| Seed particles | | | | | | | |
| Type | A | A | A | B | C | D | D |
| Amount | 10 | 8 | 25 | 8 | 20 | 30 | 30 |
| Monomer | | | | | | | |
| Divinylbenzene | 28 | 15 | 28 | — | 28 | 28 | 28 |
| TMPTM (6) | — | 13 | — | 33 | — | — | — |
| DMAPAAQ (1) | 1 | — | — | — | 1 | 1 | — |
| Styrene | 12 | 12 | 47 | 7 | — | 12 | 12 |
| α-styrene | — | — | 5 | — | — | 5 | — |
| Methyl methacrylate | 59 | 59 | — | 59 | 59 | 22 | 59 |
| t-butyl methacrylate | — | — | 19 | — | 12 | 30 | — |
| Hydroxyethyl methacrylate | — | 1 | 1 | 1 | — | 2 | 1 |
| Polymerization initiator | | | | | | | |
| V-50 (2) | 1 | 1 | — | 1 | — | 1 | 1 |
| Benzoyl peroxide | — | — | 1 | — | 1 | — | — |
| Physical properties of the hollow crosslinked particles (mV) | | | | | | | |
| Zeta potential | | | | | | | |
| pH: 2 | 40 | 33 | 28 | 31 | 38 | 39 | 32 |
| pH: 6 | 36 | 27 | 18 | 26 | 34 | 36 | 26 |
| pH: 9 | 32 | 25 | 15 | 22 | 30 | 31 | 21 |
| Volume hollowness (%) | 30 | 25 | 18 | 15 | 23 | 12 | 18 |
| Average particle diameter (μm) | 0.2 | 0.3 | 0.1 | 0.2 | 0.2 | 0.3 | 0.3 |

TABLE 1-3

| | Comparative Example | | | | |
|---|---|---|---|---|---|
| | 1-1 | 1-2 | 1-3 | 1-4 | 1-5 |
| Seed particles | | | | | |
| Type | A | A | D | E | F |
| Amount | 10 | 10 | 30 | 10 | 10 |
| Monomer | | | | | |
| Divinylbenzene | — | 0.5 | 28 | 28 | 28 |
| TMPTM (6) | — | — | — | — | — |
| DMAPAAQ (1) | 1 | — | — | 1 | 1 |
| Styrene | 40 | 39.5 | 12 | 12 | 12 |
| α-styrene | — | — | — | — | — |

TABLE 1-3-continued

|  | Comparative Example | | | | |
|---|---|---|---|---|---|
|  | 1-1 | 1-2 | 1-3 | 1-4 | 1-5 |
| Methyl methacrylate | 59 | 59 | 59 | 59 | 59 |
| t-butyl methacrylate |  |  |  |  |  |
| Hydroxyethyl methacrylate | — | 1 | 1 | — | — |
| Polymerization initiator |  |  |  |  |  |
| V-50 (2) | 1 | 1 | — | 1 | 1 |
| Benzoyl peroxide | — | — | 1 | 1 | 1 |
| Physical properties of the hollow crosslinked particles |  |  |  |  |  |
| Zeta potential (mV) |  |  |  |  |  |
| pH: 2 | 39 | 40 | 8 | 40 | 38 |
| pH: 6 | 36 | 35 | 2 | 35 | 34 |
| pH: 9 | 31 | 32 | −5 | 30 | 30 |
| Volume hollowness (%) | 0 | 0.5 | 16 | 0 | 0 |
| Average particle diameter (μm) | 0.2 | 0.2 | 0.4 | 0.2 | 0.02 |

[Description of the Components in Tables 1-1 to 1-3]
(1) DMAPAAQ: Quaternary methylene chloride salt of N-(3-dimethylaminopropyl) acrylamide (made by Koujin Co., Ltd.)
(2) V-50: 2,2'-azobis(2-methylpropionamidine) dihydrochloride (made by Wako Pure Chemicals Co., Ltd.)
(3) Coatamin 24P: 27% solution of dodecyltrimethylammonium chloride (made by Kao Co., Ltd.)
(4) Emulgen 920: Polyoxyethylene alkylphenyl ether (made by Kao Co., Ltd.)
(5) Aquaron RN20: Nonionic reactive surfactant (made by Dai-Ichi Kogyo Seiyaku Co,. Ltd.)
(6) TMPTM: trimethylolpropane trimethacrylate The following are clear from the results shown in Tables 1-2 and 1-3.

The hollow crosslinked particles produced in Examples 1-1 to 1-7 exhibit high zeta potentials across a wide pH range and are microparticles with large volume hollowness and having adequately formed voids.

Meanwhile, in the case of Comparative Example 1, in which a crosslinking monomer was not used in the polymerization process, voids were not formed in the particles obtained, and the particles did not have a hollow structure.

In the case of Comparative Example 1-2, in which the usage amount of the crosslinking monomer was less than that specified by the present invention, the volume hollowness was extremely small and the particles practically did not have a hollow structure.

In the case of Comparative Example 1-3, in which a cationic group was not introduced in the seed particle preparation process nor in the polymerization process, the zeta potential was low, and the particles had a zeta potential of −5 mV and were anionic at pH 9.

In Comparative Example 4, with which the seed particles were not swellable by any of the monomers, voids were not formed and the particles did not have a hollow structure.

In Comparative Example 1-5, with which the average particle diameter was below the range specified by the present invention, voids were not formed and the particles did not have a hollow structure.

APPLICATION EXAMPLE 1-1

The aqueous dispersion of Example 1-1 was dried using a spray dryer to obtain a powder of the hollow crosslinked particles. 30 parts of this powder were mixed with 100 parts of polymethyl methacrylate resin ("Parapet G"; made by Kurare Co, Ltd.), and the mixture was melt kneaded at 200° C. using a kneader and then pelletized using an extruder. A flat plate was formed by extrusion molding from the pellets obtained, and the tensile strength test (ASTM D 638), flexural strength test (ASTM D 790), and evaluation of the appearance were performed. The results are shown in Table 1-4.

COMPARATIVE APPLICATION EXAMPLES 1-1 AND 2

Besides using the aqueous dispersion of Comparative Examples 1-1 and 1-3 as the aqueous dispersion, the same tests as those of Application Example 1 were performed. The results are shown in Table 1-4.

TABLE 1-4

|  | Application Example 1-1 | Comparative Application Example 1-1 | Comparative Application Example 1-2 |
|---|---|---|---|
| Aqueous dispersion | Example 1-1 | Comparative Example 1-1 | Comparative Example 1-3 |
| Tensile strength (Kgf/cm³) | 700 | 600 | 300 |
| Flexural strength (Kgf/cm²) | 1100 | 900 | 600 |
| External appearance | White | Semi-transparent, spotted | White |

In the Application Example in which hollow crosslinked particles within the scope of the present invention were used, the plate had an adequately high strength and a good, white appearance.

Meanwhile, with Comparative Application Example 1-1, in which particles that were not hollow were used, the strength was poor and the external appearance was not fit for practical use. Also with Comparative Application Example 1-2, in which particles that did not have a cationic property within the scope of the present invention were used, the strength was extremely low.

EXAMPLE 2

Paint compositions are examined in this set of examples.
[Preparation of Aqueous Dispersion of Cationic Hollow Crosslinked Polymer Particles]

An aqueous dispersion of cationic hollow crosslinked polymer particles (A-1) was obtained using the same preparation procedure as Example 1 described above. The zeta potential, volume hollowness, and average particle diameter were measured using the same methods as described above in the same manner as in Example 1.

As a result, the particles were found, as in Example 1, to have a zeta potential of +40 mV at pH 2, +36 mV at pH 6, and +32 mV at pH 9, a volume hollowness of 30%, and an average particle diameter of 0.2 μm.
[Preparation of Film-Forming Cationic Polymer Emulsion (B-1)]

100 parts of a mixture, consisting of 60 parts of methyl methacrylate, 13 parts of n-butyl methacrylate, 15 parts of ethylhexyl acrylate, 9 parts of n-butyl acrylate, and 13 parts dimethylaminoethyl methacrylate, were stirred along with 3 parts of dodecylbenzylammonium chloride and 45 parts of ion-exchanged water in an agitating homomixer, and after emulsification, 5% of the mixture (emulsion A) was taken out (the remaining part was identified as emulsion B). As an initiator, 0.4 parts of a 2,2-azobis(2-aminodipropane) hydrochloride salt were dissolved in 5 parts of ion-exchanged water (this was identified as solution C).

The oxygen in a separable flask, equipped with a stirrer and a nitrogen introduction tube, was replaced by nitrogen, and after adding 52 parts of ion-exchange water, the temperature was raised to 70° C., and emulsion A was added at the same time as 5% of the abovementioned solution C to start the polymerization reaction. Stirring was continued during the polymerization reaction, and after 1 hour of polymerization, the remaining emulsion B and solution C were dripped in simultaneously and continuously over a period of 3.5 hours.

Thereafter, the temperature of the interior of the reaction container was raised to 80° C., and after carrying out maturation reaction for 1 hour, the reaction container was cooled to end the reaction. Dilute hydrochloric acid was then added to obtain a cationic polymer emulsion (B-1).

The cationic polymer emulsion (B-1) that was obtained had a solids concentration of 50.0% and the particle diameter was 0.1 to 0.3 µm.

[Preparation of Cationic Paint]

60 parts as particles of the above-described aqueous dispersion of cationic hollow crosslinked polymer particles (A-1), 100 parts as solids of the above-described cationic polymer emulsion, and 10 parts of a plasticizer (CS-12, made by Chisso Co, Ltd.; substance name: 2,2,4-trimethyl-1,3-pentadiol monoisobutyrate) were mixed using a mechanical stirrer to prepare a cationic paint. For this paint, the preservation stability was evaluated and the hiding ratio of the film formed from the paint was evaluated by the methods described below. The results are shown in Table 1.

(Measurement and Evaluation Methods)

(1) Paint Stability:

After stirring 1000 g of paint, the paint was placed in a sealed container and left for 7 days at 25° C. Thereafter, 1 g of liquid was collected from the top part, dried for 10 minutes at 200° C., and the amount of solids was measured from the change of weight before and after drying. The stability was evaluated as ◯ if the difference between the solids amount measured in advance immediately after paint preparation was less than 2%, and the stability was evaluated as × if the abovementioned difference was 2% or greater.

(2) Hiding Ratio:

The paint was coated onto a hiding ratio testing paper (made by the Japan Paint Inspection Association) to a thickness of 5 mills (0.127 mm), and after curing the coat for 10 minutes under 120° C., the Y value was measured using a color-difference meter and the black part/white part ratio was determined as the hiding ratio.

COMPARATIVE EXAMPLE 2-1

[Preparation of Titanium Paste (A'-1)]

10 parts of a 27% solution of dodecyltrimethylammonium chloride (Coatamin 24P, made by Kao Corp.), 5 parts of polyoxyethylene nonylphenyl ether (Emulgen 920, made by Kao Corp.), and 10 parts of water were loaded into a tank in advance, and then 60 parts of titanium oxide (R-780, made by Ishihara Industries Co, Ltd.) were added gradually while stirring with a disperser to prepare a titanium paste.

[Preparation of Cationic Paint]

60 parts as titanium oxide of the abovementioned titanium paste (A'-1), 100 parts as solids of the abovementioned cationic polymer emulsion, and a plasticizer (CS-12, made by Chisso Co, Ltd.) were mixed using a mechanical stirrer to prepare a cationic paint.

This cationic paint was evaluated by the above-described methods, and the results thereof are shown in Table 1.

COMPARATIVE EXAMPLE 2-2

[Preparation of Aqueous Dispersion of Hollow Crosslinked Particles (A'-2)]

Hollow crosslinked particles (A'-2) were prepared in accordance with Example 1 of Japanese Laid-open Patent Publication No. 27639 of 1998.

That is, 1 part of a nucleus polymer (seed) forming monomer mixture (a), consisting of 60% methyl methacrylate, 5% butyl acrylate, and 35% methacrylic acid, 0.005 parts of the emulsifier, sodium dodecylbenzenesulfonate (DBS), and 0.8 parts of ion-exchanged water were mixed under stirring to prepare an emulsion (i).

Separately, 10 parts of a core polymer forming monomer mixture (b), consisting of 70% methyl methacrylate, 10% butyl acrylate, and 20% methacrylic acid, 0.05 parts of an emulsifier (DBS), and 8 parts of ion-exchanged water were mixed under stirring to prepare an emulsion (ii). Also, 25 parts of an intermediate layer polymer forming monomer mixture (c), consisting of 78% methyl methacrylate, 16% butyl acrylate, and 6% methacrylic acid, 0.1 parts of an emulsifier (DBS), and 35 parts of ion-exchanged water were mixed under stirring to prepare an emulsion (iii). Furthermore, 37.5 parts of styrene, 0.3 parts of an emulsifier (DBS), and 16 parts of ion-exchanged water were mixed under stirring to prepare and outer layer polymer forming emulsion (iv).

2.87 parts of ion-exchanged water and 0.04 parts (as solids) of an acrylic seed latex, with a 35 nm particle diameter and a solids concentration of 12%, were loaded into a reactor, equipped with a stirring device, reflux cooling tube, thermometer, and separating funnel, and the temperature was raised to 80° C. 0.17 parts of potassium persulfate (3% aqueous solution) were then added via the separating funnel, emulsion (i) was added continuously over a period of 4 hours, and polymerization was then carried out further for 1 hour to obtain a core polymer emulsion. The polymer conversion rate of monomer mixture (i) was 99%.

After then adding 28 parts of ion-exchanged water and 1.7 parts of the 3% aqueous solution of potassium persulfate, emulsion (ii) was added continuously to the abovementioned reactor over a period of 3 hours. After addition, polymerization was carried out further for 2 hours to form the core polymer. The polymer conversion rate of monomer mixture (ii) was 99%. After then adding 240 parts of ion-exchanged water and 6.7 parts of the 3% aqueous solution of potassium persulfate, emulsion (iii) was added continuously to the abovementioned reactor over a period of 4 hours. After addition, polymerization was carried out further for 2 hours to form the intermediate layer polymer. The polymer conversion rate of monomer mixture (iii) was 99%.

The temperature was then raised further to 85° C., and after adding 6.7 parts of the 3% aqueous solution of potassium persulfate, emulsion (iv) was added continuously to the abovementioned reactor over a period of 1.5 hours. After addition, polymerization was carried out further for 1 hour to form the outer layer polymer. The polymer conversion rate of monomer mixture (iv) was 99%. 9 parts of a 10% aqueous solution of sodium hydroxide were dripped via the separating funnel into the latex containing the polymer particles obtained as described above, and 30 minutes later, heating was continued at 85° C. to perform base treatment. At this stage, a part of the latex was sampled, and the pH of the latex at room temperature was found upon measurement to be 8.1.

0.75 parts of N,N-dimethylaminomethyl methacrylate were then dripped in and the system was then left to react at 85° C. for 30 minutes to obtain an aqueous dispersion of hollow crosslinked particles (A'-2).

The physical properties of the ampholytic hollow crosslinked polymer particles (A'-2) that were obtained were as follows:

Zeta potential: +21 mV at pH 2, +5 mV at pH 6, −12 mV at pH 9

Volume hollowness: 30%

Average particle diameter: 200 nm

[Preparation of Paint]

60 parts as the hollow crosslinked particles (A'-2) of the abovementioned aqueous dispersion of hollow crosslinked particles (A'-2), 100 parts as solids of the abovementioned cationic polymer emulsion, and 10 parts of plasticizer (CS-12, made by Chisso Co, Ltd.) were mixed using a mechanical stirrer to prepare a paint. This paint was evaluated using the above-described methods, and the results are shown in Table 2-1.

TABLE 2-1

|  | Example | Comparative Example | |
| --- | --- | --- | --- |
|  | 2-1 | 2-1 | 2-2 |
| Paint stability | ◯ | X | ◯ |
| Hiding ratio (%) | 80 | 85 | 30 |

The results in Table 2-1 show that whereas the paint of Example 2-1 is excellent in both paint stability and hiding property, the paint of Comparative Example 2-1, in which titanium oxide was used in place of the cationic hollow crosslinked polymer particles, was poor in paint stability, and the paint of Comparative Example 2-2, in which hollow crosslinked particles were used, was poor in hiding property.

EXAMPLE 3

Cationic electrodeposition paint compositions are examined in this set of examples.

EXAMPLE 3-1

[Preparation of Aqueous Dispersion of Cationic Hollow Crosslinked Polymer Particles (A-1)]

An aqueous dispersion of cationic hollow crosslinked polymer particles (A-1) was obtained using the same preparation procedure as Example 1 described above. The zeta potential, volume hollowness, and average particle diameter were measured using the same methods as described above in the same manner as in Example 1.

As a result, the particles were found, as in Example 1, to have a zeta potential of +40 mV at pH 2, +36 mV at pH 6, and +32 mV at pH 9, a volume hollowness of 30%, and an average particle diameter of 0.2 μm.

[Preparation of Film-Forming Cationic Resin (Oxazolidone-Ring-Containing Cationic Resin) Solution]

(i) Production of Resin Modifier 46.73 parts of Coronate 1104 (MDI made by Nihon Polyurethane Co, Ltd.; NCO equivalent: 133.5) and 21.93 parts of MIBK were placed in a flask, equipped with a stirrer, cooler, nitrogen introduction tube, thermometer, and dripping funnel, and while stirring and bubbling nitrogen, 6.42 parts of methanol were dripped into the flask. The temperature rose from room temperature to 60° C. After stirring for 30 minutes at that temperature, the temperature was raised to 100° C., 20.88 parts of ethylene glycol mono-2-ethylhexyl ether were dripped in, and stirring was performed for 1 hour. Thereafter, 0.01 parts of dibutyltin laurate and 13.7 parts of BP-5B (addition product of bisphenol A with 5 moles of propylene oxide; made by Sanyo Kasei Co, Ltd.) were loaded, the reaction was continued at 120° C. until the isocyanate group was found, by infrared spectrometer, to have been eliminated, and then cooling was performed. The non-volatile content was 80%.

(ii) Synthesis of Oxazolidone-Ring-Containing Cationic Resin Solution 357.2 parts of DER-331J (bisphenol A type diglicydyl ether, made by Mitsubishi Dow Co, Ltd.; epoxy equivalent: 188), 21.32 parts of methyl isobutyl ketone (MIBK), 17.98 parts of methanol, and 0.01 parts of dibutyltin laurate were placed in the same type of flask as described in (i) above, and nitrogen was bubbled in while stirring. During this process, 47.85 parts of TDI-80 (trilene diisocyanate, made by Nihon Polyurethane Co, Ltd.; NCO equivalent: 87) were dripped in. The temperature was raised from room temperature to 60° C. The reaction was continued at that temperature until the isocyanate group was found, by infrared spectrometer, to have been eliminated. Thereafter, 0.743 parts of dimethylbenzylamine were added, the temperature was raised to 130° C., and the reaction was continued for 3 hours. At this point, absorption at 1750 cm−1, due to the carbonyl group of the oxazolidone ring, was observed by the infrared spectrometer.

Cooling was then performed to 120° C., 52.13 parts of 2-ethylhexanoic acid were added, and after the reaction was continued for 1 hour, 109.66 parts of the resin modifier synthesized in (i) above were added, and the reaction was continued for 4 hours at 140° C. Thereafter, the reaction system was cooled to 120° C., 30.78 parts of bisphenol A were added, and the reaction was continued for 3 hours.

Thereafter, the reaction system was cooled to 100° C., 21 parts of ethylene glycol mono-2-ethylhexyl ether, 24.03 parts of N-methylethanolamine, 10.84 parts of di-n-butylamine, and 31.67 parts of diethylenetriamine MIBK ketimine (73% MIBK solution) were added, and the temperature was raised to 120° C. The reaction was continued for 2 hours at the same temperature to obtain an oxazolidone-ring-containing cationic resin solution. The non-volatile content was 85%.

[Synthesis of Blocked Isocyanate Curing Agent]

723 parts of 2,5- and 2,6-bis(isocyanatemethyl)-bicyclo[2.2.1]heptane (made by Mitsui Toatsu Co, Ltd.; NCO equivalent =103), 333 parts of MIBK, and 0.01 parts of dibutyltin laurate were weighed into a flask, equipped with a stirrer, cooler, nitrogen introduction tube, thermometer, and dripping funnel, and the temperature was raised to 70° C. After uniform dissolution, 610 parts of methyl ethyl ketoxime were dripped in over a period of 2 hours. After completion of dripping, the reaction was continued while maintaining the reaction temperature of 70° C. and until the NCO group was found, by IR analysis, to have been eliminated. The curing agent was obtained thereby.

[Preparation of Oxazolidone-Ring-Containing Cationic Resin Emulsion (B-1)]

365 parts (as solids) of the oxazolidone-ring-containing cationic resin emulsion prepared in the above-described manner and 130.0 parts of the blocked isocyanate curing agent synthesized in the above manner were mixed uniformly, 1.1 parts of glacial acetic acid and 6.3 parts of formic acid were added for neutralization, and 663.6 parts of deionized water were added for gradual dilution. Solvent removal was then performed under reduced pressure so that the solids content will be 36.0%. An oxazolidone-ring-containing cationic resin emulsion (B-1) was prepared thereby. This emulsion also contains the blocked isocyanate curing agent.

[Preparation of Cationic Electrodeposition Paint]

250 parts of the cationic hollow crosslinked polymer particles (A-1), 890 parts of the oxazolidone-ring-containing cationic resin emulsion (B-1), and 1% with respect to solids of dibutyltin oxide were mixed, deionized water was added, and the mixture was adjusted to a non-volatile content of 20% to obtain a cationic electrodeposition paint. The preservation stability of this cationic electrodeposition paint was evaluated and the hiding property of the film formed by the cationic electrodeposition method was evaluated by the methods described below. The results are shown in Table 1.

[Evaluation of the Cationic Electrodeposition Paint]

(1) Paint Stability:

After stirring 100 g of the cationic electrodeposition paint, the paint was left for 7 days at 40° C. and then the residue resulting from filtration through a 300-mesh screen was weighed.

(2) Hiding Property:

The cationic electrodeposition paint was electrodeposited to a thickness of 15 μm onto a cold-rolled steel plate that had been subject to zinc phosphate treatment and after stoving for 10 minutes at 180° C., the hiding property was evaluated as × if the substrate was recognizable visually and as ○ if the substrate was completely hidden.

COMPARATIVE EXAMPLE 3-1

[Preparation of Titanium Paste (A'-1)]

10 parts of a 27% solution of dodecyltrimethylammonium chloride (Coatamin 24P, made by Kao Corp.), 5 parts of polyoxyethylene nonylphenyl ether (Emulgen 920, made by Kao Corp.), and 10 parts of water were loaded into a tank in advance, and then 60 parts of titanium oxide (R-780, made by Ishihara Industries Co, Ltd.) were added gradually while stirring with a disperser to prepare a titanium paste.

[Preparation of Cationic Electrodeposition Paint]

Besides using 20 parts of the titanium paste (A'-1) in place of the cationic hollow crosslinked polymer particles (A-1), a cationic electrodeposition paint was prepared in the same manner as in Example 3-1, and the same evaluations as those carried out in Example 3-1 were carried out. The results are shown in Table 3-1.

COMPARATIVE EXAMPLE 3-2

Besides using 250 parts of the titanium paste (A'-1) in preparing the cationic electrodeposition paint of Comparative Example 3-1, a cationic electrodeposition paint was prepared in the same manner as in Comparative Example 1 and the same evaluations as those carried out in Example 1 were carried out. The results are shown in Table 3-1.

TABLE 3-1

|  | Example 3-1 | Comparative Example 3-1 | Comparative Example 3-2 |
| --- | --- | --- | --- |
| Paint stability (mg) | 20 | 50 | 6000 |
| Hiding property | ○ | X | ○ |

The following are clear from the results shown in Table 3-1.

The paint of Example 3-1 is excellent in both paint stability and hiding property.

On the other hand, with Comparative Example 3-1, in which a small amount of titanium oxide was used in place of the cationic hollow crosslinked polymer particles, the paint stability and the hiding property were poor. With Comparative Example 3-2, in which a normal amount of titanium oxide was used, the paint stability was significantly poor.

EXAMPLE 4

Resin compositions are examined in this set of examples.

Example 4-1

As in Example 1 described above, seed particles, which are swellable polymer particles, were obtained in the same manner as in Synthesis Example 1 and an aqueous dispersion containing cationic hollow crosslinked polymer particles (A) was obtained in the same manner as in Example 1. The zeta potential, volume hollowness, and average particle diameter were measured using the same methods as described above in the same manner as in Example 1.

As a result, the particles were found, as in Example 1, to have a zeta potential of +40 mV at pH 2, +36 mV at pH 6, and +32 mV at pH 9, a volume hollowness of 30%, and an average particle diameter of 0.2 μm.

By using a spray dryer to dry the abovementioned aqueous dispersion of cationic hollow crosslinked polymer particles (A), a powder of the cationic hollow crosslinked polymer particles (A) was obtained.

SYNTHESIS EXAMPLE 2

<Synthesis of Anionic Hollow Crosslinked Polymer Particles (B)>

While stirring an aqueous solution, prepared by dissolving 0.5 parts of sodium lauryl sulfate and 1 part of potassium persulfate in 200 parts of water, into 70 parts of styrene, 27 parts of butadiene, 3 parts of itaconic acid, and 12 parts of t-dodecyl mercaptan, polymerization was carried out for 8 hours at 70° C. to obtain polymer particles. These polymer particles had an average particle diameter of 0.24 μm, a toluene-insoluble content of 6%, a number average molecular weight by GPC of 5,000, and a weight average molecular weight to number average molecular weight ratio (Mw/Mn) of 2.6.

These polymer particles were then used as seed particles. That is, 10 parts as solids of these polymer particles, 0.1 parts of polyoxyethylene nonylphenyl ether, 0.4 parts of sodium lauryl sulfate, and 0.5 parts of potassium persulfate were dispersed in 900 parts of water. A mixture of 30 parts of methyl methacrylate, 50 parts of divinylbenzene, 18 parts of α-methylstyrene, 2 parts of acrylic acid, and 20 parts of toluene was then added, and upon polymerization for 5 hours at 70° C., a dispersion of capsule particles, with which toluene was contained in the particle interior, was obtained at a polymerization yield of 98%.

Upon performing stream stripping treatment on this dispersion and observing the polymer particles under a transmission electron microscope, the polymer particles were found to have a transparent central part and to be completely spherical anionic hollow crosslinked polymer particles. The outer diameter of these particles was 0.44 μm and the inner diameter was 0.3 μm.

Zeta potential: −5 mV at pH 2, −28 mV at pH 6, −35 mV at pH 9

Volume hollowness: 30%

Average particle diameter: 0.44 μm

By using a spray dryer to dry the abovementioned aqueous dispersion of anionic hollow crosslinked polymer particles (B), a powder of the anionic hollow crosslinked polymer particles (B) was obtained.

EXAMPLES 4-1 TO 4-8 AND COMPARATIVE EXAMPLES 4-1 TO 4-8

Using a Henschel mixer, the thermoplastic resin pellets indicated in Tables 4-1 and 4-2 were mixed with the cationic hollow crosslinked polymer particles (A) indicated in Table 4-1 or the anionic hollow crosslinked polymer particles (B) indicated in Table 4-2 (this mixing method shall be referred to as the "dry method"). Thereafter, each of the mixtures was supplied into an extruder and melt mixed, and a plate was extrusion molded. Test pieces for Izod impact strength measurement were cut out from these plates, and the Izod impact strengths were measured in accordance with ASTM D-256 (with notch). The measurement results are shown in Table 4-1 (Examples 4-1 to 4-8) and Table 4-2 (Comparative Examples 4-1 to 4-8).

The T1 to T6 indicated in Tables 4-1 and 4-2 are the following resins.

- T-1: ABS resin, with which the polybutadiene rubber content is 20%, the content of styrene as monomer units is 60%, the content of acrylonitrile as monomer units is 20%, and the graft percentage is 35%.
- T-2: ABS resin, with which the polybutadiene rubber content is 40%, the content of styrene as monomer units is 45%, the content of acrylonitrile as monomer units is 15%, and the graft percentage is 50%.
- T-3: Copolymer of 75% styrene and 25% acrylonitrile.
- T-4: Polycarbonate resin
- T-5: Polybutylene terephthalate resin
- T-6: Nylon 6 resin

TABLE 4-1

|  | Example | | | | | | | |
|---|---|---|---|---|---|---|---|---|
|  | 4-1 | 4-2 | 4-3 | 4-4 | 4-5 | 4-6 | 4-7 | 4-8 |
| Thermoplastic resin (%) | | | | | | | | |
| T-1 | 80 | | | | | | 80 | 90 | 60 |
| T-2 |  | 40 | | | | | | | |
| T-3 |  | | 40 | | | | | | |
| T-4 |  | | | 80 | | | | | |
| T-5 |  | | | | 80 | | | | |
| T-6 |  | | | | | 80 | | | |
| Cationic hollow crosslinked polymer particles (A) (%) | 20 | 20 | 20 | 20 | 20 | 20 | 10 | 40 |
| Izod impact strength (Kg · cm/cm) | 9 | 9 | 7 | 5 | 5 | 9 | 19 | 7 |

TABLE 4-2

|  | Comparative Example | | | | | | | |
|---|---|---|---|---|---|---|---|---|
|  | 4-1 | 4-2 | 4-3 | 4-4 | 4-5 | 4-6 | 4-7 | 4-8 |
| Thermoplastic resin (%) | | | | | | | | |
| T-1 | 80 | | | | | 80 | 90 | 60 |
| T-2 |  | 40 | | | | | | |
| T-3 |  | 40 | | | | | | |
| T-4 |  | | 80 | | | | | |
| T-5 |  | | | 80 | | | | |
| T-6 |  | | | | 80 | | | |
| Anionic hollow crosslinked polymer particles (B) (%) | 20 | 20 | 20 | 20 | 20 | 20 | 10 | 40 |
| Izod impact strength (Kg · cm/cm) | 6 | 6 | 5 | 3 | 3 | 7 | 15 | 5 |

EXAMPLE 4-9

Using the abovementioned cationic hollow crosslinked polymer particles (A), a thermosetting resin composition (epoxy resin composition) was obtained in accordance with the following procedure.

| Cresol novolak type epoxy resin (epoxy equivalent: 200) | 100 weight parts |
|---|---|
| Phenol resin (novolak type) | 50 weight parts |
| Curing agent (2-methylimidazole) | 5 weight parts |
| Cationic hollow crosslinked polymer particles (A) | 37.5 weight parts |

The above were kneaded adequately at approximately 80° C. using a sealed mixer, brass molding was performed at 160° C., and the molded plate obtained was processed with a milling machine to prepare a physical property evaluation sample. The Izod impact strength was then measured in accordance with ASTM D-256 (with notch) and the flexural strength was measured in accordance with ASTM D-790. The measurement results are shown in Table 4-3.

EXAMPLES 4-10 TO 11 AND COMPARATIVE EXAMPLES 4-9 TO 11

Besides using the blend components shown in Table 4-3, the same procedures as those of Example 4-9 were carried out. The evaluation results are shown in Table 4-3.

TABLE 4-3

|  |  | Example | | | Comparative Example | | |
|---|---|---|---|---|---|---|---|
|  |  | 4-9 | 4-10 | 4-11 | 4-9 | 4-10 | 4-11 |
| Blend components | Thermosetting resin component (parts) | | | | | | |
| and proportions | Cresol novolak type epoxy resin | 100 | | | 100 | | |
|  | Phenol resin (novolak type) | 50 | 100 | 100 | 50 | 100 | 100 |
|  | Curing agent component (parts) | | | | | | |
|  | 2-methylimidazole | 5 | | | 5 | | |
|  | Hexamechylenetetaramine |  | 10 | 10 |  | 10 | 10 |
|  | Hollow crosslinked polymer particles component (parts) | | | | | | |
|  | Cationic hollow crosslinked polymer particles (A) | 37.5 | 25 | 66.5 | | | |
|  | Anionic hollow crosslinked polymer particles (B) |  |  |  | 37.5 | 25 | 66.5 |

TABLE 4-3-continued

|  |  | Example | | | Comparative Example | | |
|---|---|---|---|---|---|---|---|
|  |  | 4-9 | 4-10 | 4-11 | 4-9 | 4-10 | 4-11 |
|  | Thermosetting resin composition | | | | | | |
|  | Thermosetting resin component (%) | 80 | 80 | 60 | 80 | 80 | 60 |
|  | Hollow crosslinked polymer particle component (%) | 20 | 20 | 40 | 20 | 20 | 40 |
| Physical | Flexural strength (kgf/mm$^2$) | 3.5 | 3.1 | 3.1 | 3.2 | 2.6 | 2.5 |
| properties | Izod impact strength (kg · cm/cm) | 5.8 | 4.5 | 4.4 | 3.1 | 3 | 3.1 |

The following are clear from the results shown in Tables 4-1 and 4-2.

With the Examples in which cationic hollow crosslinked polymer particles were used, excellent impact resistance was realized in comparison to the Comparative Examples in which prior-art anionic hollow crosslinked polymer particles were used. This can be said to be due to the strong force affinity that arises between the hollow particles and the thermoplastic resin, which is the matrix, in the resin composition of the Examples of the present invention.

The same can be said of compositions using thermosetting resins from the results shown in Table 4-3.

EXAMPLE 5

Paper coating compositions, coated paper, and filled paper are examined in this set of examples.

EXAMPLE 5-1
<Examples and Comparative Examples Concerning Paper Coating Compositions>[Hollow Polymer Particles (A-1) Crosslinked Hollow Cationic Particles]

Seed particles A were prepared and hollow polymer particles (A-1) (cationic hollow crosslinked polymer particles) were obtained by polymerization in the same manner as in Example 1. The zeta potential, volume hollowness, and average particle diameter of these hollow polymer particles (A-1) were measured using the above-described methods in the same manner as in Example 1.

The results were as follows:
Zeta potential: +40 mV at pH 2, +36 mV at pH 6, +32 mV at pH 9
Volume hollowness: 30%
Average particle diameter: 0.4 μm

[Hollow Polymer Particles (A-2) Non-Crosslinked Hollow Anionic Particles]

The polymer of hollow polymer particles (A-2) is comprised of 40 weight % styrene component, 50 weight % methyl methacrylate component, and 10 weight % methacrylic acid component. The physical properties of these particles were as follows:
Zeta potential: −5 mV at pH 2, −20 mV at pH 6, −30 mV at pH 9
Volume hollowness: 30%
Average particle diameter: 0.3 μm; hollow polymer particles

[Binder Component: Copolymer Latex (B-1)]

The first-stage components shown in Table 5-1 were loaded into a pressure-resistant reaction container equipped with a stirring device and a temperature controller, and after performing nitrogen replacement of the interior of the polymerization system, the internal temperature of the polymerization system was raised to 40° C., polymerization was carried out for 2 hours, and then the second-stage components and a ½ amount of the aqueous solution of reducing agent indicated in Table 5-2 were added continuously over a period of 5 hours into the polymerization system. Thereafter, the remaining ½ amount of the aqueous solution of reducing agent was added continuously over a period of 5 hours into the polymerization system to complete the polymerization. The final polymer conversion rate was 98%.

The copolymer latex that was obtained was adjusted to a pH of 7.5 using acetic acid, water vapor was blown in to remove unreacted monomers, and a copolymer latex (B-1) with a solids concentration of 50% was obtained by heated vapor distillation. The characteristics of copolymer latex (B-1) are shown in Table 5-2.

(Method of Measuring the Amount of Toluene-Insoluble Parts in the Copolymer Latex)

After adjusting the copolymer latex to a pH of 8.0, the latex was coagulated using isopropanol. After then washing and drying the coagulated solids, a predetermined amount (approximately 0.03 g) of the sample was immersed in a predetermined amount (100 ml) of toluene for 20 hours. Thereafter, filtration through a 120-mesh screen was performed and the weight % of the residual solids with respect to the total solids loaded was determined.

TABLE 5-1

| Copolymer latex | B-1 |
|---|---|
| (First stage components) (parts) | |
| Water | 100 |
| Coatamin 24P (made by Kao Co. Ltd.) | 2 |
| V-50 (made by Wako Pure Chemicals Co. Ltd.) | 1 |
| Butadiene | 5 |
| Styrene | 2 |
| Acrylonitrile | 2 |
| DMAPAA-Q (made by Koujin Co. Ltd.) | 0.5 |
| t-dodecyl mercaptan | 0.3 |
| (Second stage components) (parts) | |
| Butadiene | 35 |
| Styrene | 25 |
| Acrylonitrile | 9 |
| Methyl methacrylate | 20 |
| DMAPAA-Q (made by Koujin Co. Ltd.) | 1.5 |
| α-methylstyrene dimer | 0.4 |
| t-dodecyl mercaptan | 0.4 |

TABLE 5-2

| Copolymer latex | B-1 |
|---|---|
| (Aqueous solution of reducing agent) (parts) | |
| Water | 10 |
| Sodium hydrogen sulfite | 0.3 |
| DBS-Na | 0.2 |
| (Characteristics of the latex) | |
| Average particle diameter (nm) | 115 |
| Toluene-insoluble parts (%) | 73 |

EXAMPLE 5-1 AND COMPARATIVE EXAMPLE 5-1

(1) Preparation of Paper Coating Composition

A paper coating composition was prepared by dissolving 0.05 parts of a dispersing agent in water, adding hollow polymer particles (A-1) (Example 5-1) or (A-2) (Comparative Example 5-1), copolymer latex (B-1) of the amounts shown in Table 5-3, and 3 parts of starch (MS-4600, made by Nihon Shokuhin Co., Ltd.) while stirring with a Corliss disperser, and then adding water so that the solids content will be 62%.

(2) Preparation of Coated Paper

The paper coating composition prepared in the above-described manner was coated using a rod bar onto a commercially available wood-free paper (weight: 72 g/m$^2$) so that the coating amount will be 3 g/m$^2$ (on one side) and drying was then performed for 5 seconds in a Geer oven for 150° C. The one-side-coated paper that was obtained was pass twice through a laboratory super calender (made by Yuri Roll Co, Ltd.) set at a roll surface temperature of 40° C. and line pressure of 10 N/m to obtain coated paper with gloss.

(3) Evaluation of Coated Paper

The paper coating composition prepared in the above-described manner was evaluated by the following test methods. The results are shown in Table 5-3.

① Dry Pick Strength

The degree of picking upon printing by an RI printer was judged with the naked eye and subject to a five-stage evaluation. Paper with less picking was given a higher score. The values shown in the Table are average values for six measurements.

② Wet Pick Strength

After wetting the coated paper surface by using a water absorbing roll in an RI printer, the degree of picking upon printing by the RI printer was judged with the naked eye and subject to a five-stage evaluation. Paper with less picking was given a higher score. The values shown in the Table are average values for six measurements.

③ White Paper Gloss

The gloss was measured using a Murakami type glossmeter (75°). The higher the value, the better the gloss.

④ Opacity

The opacity was measured using a Hunter colorimeter.

⑤ (Whiteness)

The whiteness was measured using a Hunter colorimeter. The higher the value, the better the whiteness.

TABLE 5-3

| | Example 5-1 | Comparative Example 5-1 |
|---|---|---|
| Pigment component | | |
| (A) Hollow polymer particles (solids) (parts) | A-1 100 | A-2 100 |
| Binder component | | |
| Copolymer latex (solids) (parts) | B-1 6 | B-1 6 |
| Evaluation of coated paper | | |
| Coating amount (one side; g/m$^2$) | 3 | 3 |
| Dry pick strength | 4.5 | 3.8 |
| Wet pick strength | 4.6 | 3.9 |
| White paper gloss (%) | 73.2 | 68.0 |
| Opacity (%) | 91.3 | 90.0 |
| Whiteness (%) | 73.1 | 68.2 |

The results shown in Table 5-3 clearly indicate that the coated paper (Example 5-1), which was coated by the coating composition having the cationic hollow crosslinked polymer particles of the present invention blended therein, excels over the coated paper (Comparative Example 5-1), which was coated by the coating composition having anionic hollow crosslinked polymer particles blended therein, in terms of dry pick strength, wet pick strength, white paper gloss, opacity, and whiteness.

Example and Comparative Example Concerning Filled Paper

EXAMPLE 5-2

[Preparation of Filled Paper]

100 parts of newspaper-blended pulp were diluted with warm water to prepare a 3% dispersion, and this dispersion was warmed to 40° C. while stirring. In continuation, 2 parts (as solids) of the hollow polymer particles (A-1) (cationic hollow crosslinked polymer particles) prepared as described above, 3 parts of sulfate band, 0.3 parts of emulsion sizer, and 0.3 parts of anionic paper strengthener were added in that order, and lastly, dilution by water was performed to achieve a pulp concentration of 1%. Paper was made from this dispersion using a rectangular sheet machine with an 80-mesh wire, and this paper was pressed for 3 minutes at 10 kg/cm$^2$, and dried for 5 minutes at 120° C. using a rotating drum dryer. The filled paper that was obtained was temperature-adjusted for 24 hours at 20° C. and a humidity of 65% and then subject to the paper quality tests.

[Paper Quality Tests]

The paper quality tests of weight (JIS P8124), whiteness (JIS P8123), opacity (JIS P8138), and tensile strength (JIS P8113) were performed on the filled paper that was prepared. The results are shown in Table 5-4.

COMPARATIVE EXAMPLE 2

Besides not using the hollow polymer particles (A-1) of Example 2, the same procedures as those of Example 5-1 were carried out. The evaluation results are shown in Table 5-4.

COMPARATIVE EXAMPLE 5-3

Besides using white carbon in place of the hollow polymer particles (A-1) of Example 5-2, the same procedures as those of Example 5-1 were carried out. The evaluation results are shown in Table 5-4.

COMPARATIVE EXAMPLE 5-4

Besides using cationic hollow polymer particles, which have a slightly crosslinked structure and were prepared by the method indicated in Example 5-1 of Japanese Laid-open Patent Publication No.74440 of 1991 (6th line of the lower right column of page 8 to 2nd line of upper right column of page 9) in place of the hollow polymer particles (A-1) of Example 5-2, the same procedures as those of Example 2 were carried out. The evaluation results are shown in Table 5-4.

TABLE 5-4

|  |  | Example 5-2 | Comparative Example 5-2 | Comparative Example 5-3 | Comparative Example 5-4 |
|---|---|---|---|---|---|
| Weight (g/m$^2$) |  | 45.1 | 44.8 | 47.4 | 45.5 |
| Whiteness | Front | 54.4 | 50.4 | 51.3 | 52.0 |
| (%) | Rear | 55.7 | 51.1 | 51.9 | 51.6 |
| Opacity | Front | 86.7 | 81.6 | 84.7 | 85.2 |
| (%) | Rear | 88.1 | 82.8 | 84.9 | 85.8 |
| Tensile strength (tearing length: km) |  | 7.4 | 6.1 | 5.9 | 7.1 |

The following are clear from the results shown in Table 5-4.

The filled paper of Example 5-2 is lightweight, excellent in whiteness and opacity, and high in strength.

On the other hand, though the paper of Comparative Example 5-2, to which filler was not added, is lightweight, it is extremely poor in terms of whiteness and opacity. The filled paper of Comparative Example 5-3, with which white carbon was used as the filler, is extremely heavy and poor in whiteness, opacity, and strength. The filled paper of Comparative Example 5-4, with which hollow polymer particles of a low degree of crosslinking was used as the filler, is poor in whiteness and opacity.

What is claimed is:

1. A cationic hollow crosslinked polymer particle comprising at least one cationic group and having
    (I) a zeta potential as measured in an aqueous medium of pH 2 to 9 of from +5 to +100 mV,
    (II) a volume hollowness of from 1 to 80%, and
    (III) an average particle diameter of from 0.03 to 10 μm.

2. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 μm,
    said method comprising,
        polymerizing a monomer mixture comprising (a) 1 to 99.99 weight % of a crosslinking monomer, (b) 0.01 to 15 weight % of a cationic monomer, and (c) 0 to 98.99 weight % of a copolymerizable monomer that is non-crosslinking and nonionic in the presence of polymer particles that are swellable by at least one of said monomers, to form the hollow crosslinked polymer particles, wherein the total amount of monomers in the monomer mixture is 100% by weight.

3. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 μm,
    said method comprising,
        polymerizing a monomer mixture comprising (a) 1 to 100 weight % of a crosslinking monomer, (b) 0 to 15 weight % of a cationic monomer, and (c) 0 to 99 weight % of a copolymerizable monomer that is non-crosslinking and nonionic with a radical polymerization initiator having a cationic group in the presence of polymer particles that are swellable by at least one of said monomers, to form the hollow crosslinked polymer particles, wherein the total amount of the monomers in the monomer mixture is 100% by weight.

4. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 μm,
    said method comprising,
        polymerizing a monomer mixture comprising (a) 1 to 100 weight % of a crosslinking monomer, (b) 0 to 15 weight % of a cationic monomer, and (c) 0 to 99 weight of a copolymerizable monomer that is non-crosslinking and nonionic in the presence of polymer particles that are swellable by at least one of said monomers, to form the hollow crosslinked polymer particles, wherein the total amount of the monomers in the monomer mixture is 100 weight %, and
        wherein said polymer particles are obtained by polymerizing a second monomer mixture (a) 0.01 to 15 weight % of a cationic monomer and (d) 85 to 99.99 weight % of a nonionic monomer that is copolymerizable with said cationic monomer, wherein the total amount of the monomers in the second monomer mixture is 100 weight %.

5. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 μm,
    said method comprising,
        polymerizing a monomer mixture comprising (a) 1 to 100 weight % of a crosslinking monomer, (b) 0 to 15 weight % of a cationic monomer, and (c) 0 to 99 weight % of a copolymerizable monomer that is non-crosslinking and nonionic in the presence of polymer particles that are swellable by at least one of said monomers, to form the hollow crosslinked polymer particles, wherein the total amount of the monomers in the monomer mixture is 100 weight %, and
        wherein said polymer particles are obtained by polymerizing a second monomer mixture (a) 0 to 15 weight % of a cationic monomer and (d) 85 to 100 weight % of a nonionic monomer that is copolymerizable with said cationic monomer with a radical polymerization initiator with a cationic group, wherein the total amount of the monomers in the second monomer mixture is 100 weight %.

6. A cationic hollow crosslinked polymer particle having
    (I) a zeta potential as measured in an aqueous medium of pH 2 to 9 of from +5 to +100 mV,
    (II) a volume hollowness of from 1 to 80%,
    (III) an average particle diameter of from 0.03 to 10 μm, and
    (IV) comprising 5 to 90 weight % of structural units derived from a crosslinking monomer and 95 to 10 weight % of polymerized structural units derived from another monomer that is copolymerizable with said cross linking monomer, and one or more cationic groups, wherein the total amount of the two types of structural units is 100 weight %.

7. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 $\mu$m and (IV) comprising 5 to 90 weight % of polymerized structural units derived from a crosslinking monomer and 95 to 10 weight % of structural units derived from another monomer that is copolymerizable with said cross linking monomer, wherein the total amount of the two types of structural units is 100 weight %, said method comprising, polymerizing a monomer mixture comprising (a) 5 to 90 weight % of a crosslinking monomer, (b) 0.01 to 15 weight % of a cationic monomer, and (c) 9.99 to 94.99 weight % of a copolymerizable monomer that is non-crosslinking and nonionic to form the hollow crosslinked polymer particles, wherein the total amount of the monomers in the monomer mixture is 100 weight %, in the presence of polymer particles that are swellable by at least one of said monomers.

8. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 $\mu$m and (IV) comprising 5 to 90 weight % of polymerized structural units derived from a crosslinking monomer and 95 to 10 weight % of structural units derived from another monomer that is copolymerizable with said crosslinking monomer, wherein the total amount of the two types of structural units is 100 weight %, said method comprising, polymerizing a monomer mixture comprising (a) 5 to 90 weight % of a crosslinking monomer, (b) 0 to 15 weight % of a cationic monomer, and (c) 10 to 95 weight % of a copolymerizable monomer that is non-crosslinking and nonionic to form the hollow crosslinked polymer particles, wherein the total amount of the monomers in the monomer mixture is 100 weight %, with a radical polymerization initiator having a cationic group in the presence of polymer particles that are swellable by at least one of said monomers.

9. A method of producing cationic hollow crosslinked polymer particles comprising one or more cationic groups and having (I) a zeta potential, as measured in an aqueous medium of pH 2 to 9, of from +5 to +100 mV, (II) a volume hollowness of from 1 to 80%, and (III) an average particle diameter of from 0.03 to 10 $\mu$m and (IV) comprising 5 to 90 weight % of polymerized structural units derived from a crosslinking monomer and 95 to 10 weight % of structural units derived from another monomer that is copolymerizable with said crosslinking monomer, wherein the total amount of the two types of structural units is 100 weight %, said method comprising, polymerizing a monomer mixture comprising (a) 5 to 90 weight % of a crosslinking monomer, (b) 0 to 15 weight % of a cationic monomer, and (c) 10 to 95 weight of a copolymerizable monomer that is non-crosslinking and nonionic to form the hollow crosslinked polymer particles, wherein the total amount of the monomers in the monomer mixture is 100 weight %, in the presence of polymer particles that are swellable by at least one of said monomers, and wherein said polymer particles are polymer particles obtained by polymerizing a second monomer mixture (b) 0.01 to 30 weight % of a cationic monomer and (d) 70 to 99.99 weight % of a nonionic monomer that is copolymerizable with said cationic monomer, wherein the total amount of the monomers in the second monomer mixture is 100 weight %.

10. A method of producing cationic hollow crosslinked polymer particles comprising one or more cationic groups and having (I) a zeta potential, as measured in an aqueous medium of pH 2 to 9, of from ≡to $\phi$mV, (II) a volume hollowness of from 1 to 80%, and (III) an average particle diameter of from 0.03 to 10 $\mu$m and (IV) comprising 5 to 90 weight % of polymerized structural units derived from a crosslinking monomer and 95 to 10 weight % of structural units derived from another monomer that is copolymerizable with said cross linking monomer, wherein the total amount of the two types of structural units is 100 weight %, said method comprising, polymerizing a monomer mixture comprising (a) 5 to 90 weight % of a crosslinking monomer, (b) 0 to 15 weight % of a cationic monomer, and (c) 10 to 95 weight of a copolymerizable monomer that is non-crosslinking and nonionic to form the crosslinked hollow polymer particles, wherein the total amount of the monomers in the monomer mixture is 100 weight %, with a radical polymerization initiator in the presence of polymer particles that are swellable by at least one of said monomers, wherein said polymer particles are polymer particles obtained by polymerizing a second monomer mixture (b) 0 to 30 weight % of a cationic monomer and (d) 70 to 100 weight % of a nonionic monomer that is copolymerizable with said cationic monomer, wherein the total amount of the monomers in the second monomer mixture is 100 weight %, with a radical polymerization initiator, wherein one or both of the radical polymerization initiators is a radical initiator having a cationic group or groups.

11. The cationic hollow crosslinked polymer particle as claimed in claim 1, wherein said cationic group is a primary amino group, secondary amino group, tertiary amino group, quaternary amino group, secondary imino group, tertiary imino group, quaternary imino group, amidino group, hydrazino group, or annular group that contains a nitrogen atom.

12. The cationic hollow crosslinked polymer particle as claimed in claim 1, wherein the concentration of said cationic group in said hollow crosslinked polymer particles is from 0.05 to 300 mmol per 100 g of particles.

13. The cationic hollow crosslinked polymer particle as claimed in claim 6, wherein said cationic group is a primary amino group, secondary amino group, tertiary amino group, quaternary amino group, secondary imino group, tertiary imino group, quaternary imino group, amidino group, hydrazino group, or annular group that contains a nitrogen atom.

14. The cationic hollow crosslinked polymer particle as claimed in claim 6, wherein the concentration of said cationic group in said hollow crosslinked polymer particles is from 0.05 to 300 mmol per 100 g of particles.

* * * * *